(12) United States Patent
Schwarz et al.

(10) Patent No.: US 12,375,674 B2
(45) Date of Patent: Jul. 29, 2025

(54) ENTROPY CODING OF TRANSFORM COEFFICIENTS SUITABLE FOR DEPENDENT SCALAR QUANTIZATION

(71) Applicant: FRAUNHOFER-GESELLSCHAFT ZUR FÖRDERUNG DER ANGEWANDTEN FORSCHUNG E.V., Munich (DE)

(72) Inventors: Heiko Schwarz, Berlin (DE); Phan Hoang Tung Nguyen, Berlin (DE); Detlev Marpe, Berlin (DE); Thomas Wiegand, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 231 days.

(21) Appl. No.: 18/110,514

(22) Filed: Feb. 16, 2023

(65) Prior Publication Data

US 2023/0199188 A1 Jun. 22, 2023

Related U.S. Application Data

(63) Continuation of application No. 17/133,736, filed on Dec. 24, 2020, now Pat. No. 11,611,750, which is a continuation of application No. PCT/EP2019/067575, filed on Jul. 1, 2019.

(30) Foreign Application Priority Data

Jul. 2, 2018 (EP) .................... 18181293

(51) Int. Cl.
*H04N 19/189* (2014.01)
*H04N 19/13* (2014.01)
*H04N 19/176* (2014.01)
*H04N 19/46* (2014.01)

(52) U.S. Cl.
CPC .......... *H04N 19/13* (2014.11); *H04N 19/176* (2014.11); *H04N 19/189* (2014.11); *H04N 19/46* (2014.11)

(58) Field of Classification Search
CPC .... H04N 19/13; H04N 19/176; H04N 19/189; H04N 19/46
See application file for complete search history.

(56) References Cited

U.S. PATENT DOCUMENTS

2002/0051540 A1 5/2002 Glick et al.
2011/0041148 A1 2/2011 Piepenbrink et al.
(Continued)

FOREIGN PATENT DOCUMENTS

EP 2680580 6/2016
WO WO 2013/065702 5/2013

OTHER PUBLICATIONS

ITU-T and ISO|IEC, "Advanced video coding for audiovisual services," ITU-T Rec. H.264 and ISO|IEC 14406-10 (AVC)., 2003.

(Continued)

*Primary Examiner* — Tyler W. Sullivan
(74) *Attorney, Agent, or Firm* — Sage Patent Group

(57) ABSTRACT

Concepts for transform coefficient block coding are described which enable coding of coefficients of a transform block in a manner suitable for dependent quantization and effectively implementable by entropy coding in terms of coding efficiency.

14 Claims, 14 Drawing Sheets

```
if( setId[ k ] == 0 ) {
   n = 2 * level[ k ]
} else {
   n = 2 * level[ k ] - sign( level[ k ] )
}
trec[ k ] = n * quant_step_size[ k ]
```

(56) References Cited

U.S. PATENT DOCUMENTS

| | | | | |
|---|---|---|---|---|
| 2013/0336409 | A1* | 12/2013 | He | H04N 19/467 375/E7.026 |
| 2014/0003533 | A1* | 1/2014 | He | H04N 19/91 375/240.01 |
| 2019/0387259 | A1* | 12/2019 | Coban | H04N 19/184 |

OTHER PUBLICATIONS

ITU-T and ISO|IEC, "High efficiency video coding," ITU-T Rec. H265 and ISO|IEC 23008-10 (HEVC)., 2013.

Part 1—Text of DIS ISO/IEC23008-2:201x High Efficiency Video Coding (4th ed.) 122. MPEG Meeting; Apr. 16-Apr. 20, 2018; San Diego; (Motion Picture Expert Group or ISO/IEC JTC1/SC29/WG11) No. N17661, May 11, 2018 (May 11, 2018), XP30024288, 2018.

Part 2—Text of DIS ISO/IEC 23008-2:201x High Efficiency Video Coding (4th ed.) 122. MPEG Meeting; Apr. 16-Apr. 20, 2018; San Diego; (Motion Picture Expert Group of ISO/IEC JTC1/SC29/WG11) No. N17661, May 11, 2018 (May 11, 2018), XP030024288, 2018.

Part 3—Text of DIS ISO/IEC 23008-2:201x High Efficiency Video Coding (4th ed.) 122. MPEG Meeting; Apr, 16, 2018-Apr. 20, 2018; San Diego; (Motion Picture Expert Group or ISO/IEC JTC1/SC29/WG11) No. N17661, May 11, 2018 (May 11, 2018), XP030024288, 2018.

Albrecht, M., et al., "Description of SDR, HDR, and 360 video coding technology proposal by Fraunhofer HHI", ITU-T Rec. H.265 and ISO|IEC 23008-10 (HEVC), 2013.

Marpe, Detlev, et al., "Unified PIPE-Baed Entropy Coding for HEVC", 6JCT-VC Meeting; 97.MPEG Meeting; Jul. 14-Jul. 22, 2011; Torino; (Joint Collaborative Team on Video Coding of ISO/IEC JTC1/SC29/WG11 and ITU-T SG.16); URL: HTTP://WFTP3.ITU.INT/AV-ARCH/JCTVC-S ITE/no.JCTVC-F268 Jul. 1, 2011 (Jul. 1, 2011) XP030009291, 2011.

\* cited by examiner

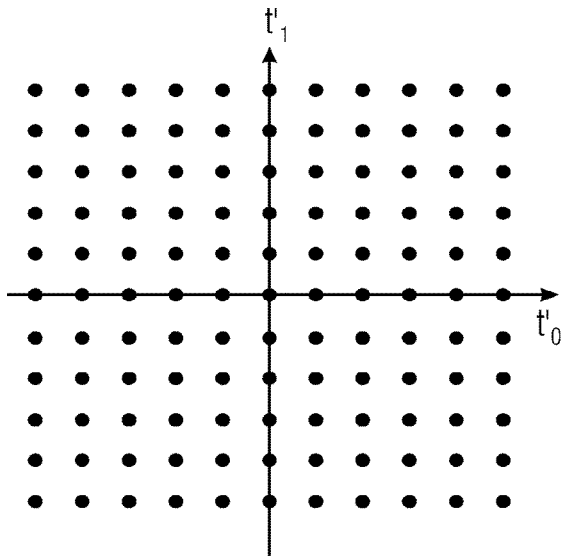
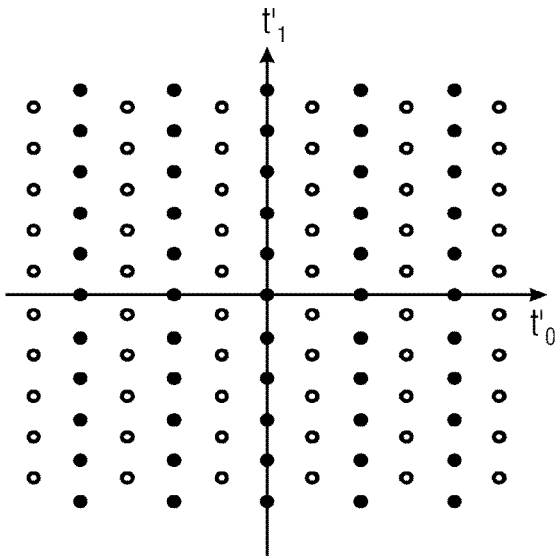
Fig. 5a                    Fig. 5b
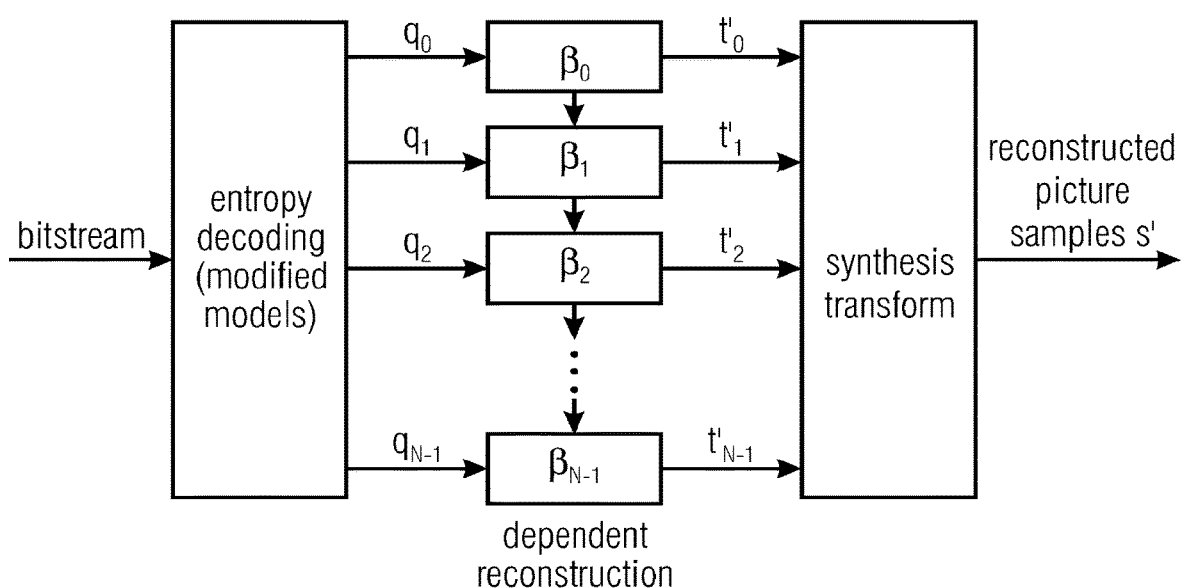
Fig. 6

```
if( setId[ k ] == 0 ) {
    n = 2 * level[ k ]
} else {
    n = 2 * level[ k ] − sign( level[ k ] )
}
trec[ k ] = n * quant_step_size[ k ]
```

```
n = 2 * level[ k ] − ( setId[ k ] > 0 ? sign( level[ k ] ) : 0 )
trec[ k ] = ( n * scale[ k ] + add ) >> shift
```

```
setId[4] = { 0, 0, 1, 1 }
state_trans_table[4][2] = { {0,2}, {2,0}, {1,3}, {3,1} } state = 0
for( k = kstart; k >= 0; k-- )
{
                                            42
    n = 2 * level[ k ] − ( setId[ state ] > 0 ? sign( level[ k ] ) : 0 )
    trec[ k ] = ( n * scale[ k ] + add ) >> shift
    state = state_trans_table[ state ][ level[ k ] & 1 ]
                                                              40
}
                      45
```

```
// absolute levels
inferSig1 = ( subblock includes DC coefficient ? 0 : 1 )
for ( k = firstScanIdSbb; k <= lastScanIdSbb; k++ )
{
    if( k == firstNonZero || { k == lastScanIdSbb && inferSig1 == 1 ) )
        sig_flag[ k ] = 1
    }
    else {
        code sig_flag[ k ]
    }
    If( sig_flag[ k ] ) {
        inferSig1 = 0
        code gt1_flag[ k ]
        if (gt1_flag[ k ] ) }    {
            code gt2_flag[ k ]
            if (gt2_flag[ k ] ) }    {
                code gt3_flag[ k ]
                if (gt3_flag[ k ] ) }    {
                    code gt4_flag[ k ]
                    if (gt4_flag[ k ] ) }    {
                        code remainder[ k ]
                    }
                }
            }
        }
    }
}

// signs
for( k = minScanIdSbb; k <= max<ScanIdSbb; k++)
}
    if sig_flag [ k ] ) }    {
        code sign_flag[ k ]
    }
}
```

Fig. 15

```
// first pass
inferSig1 = ( subblock includes DC coefficient ? 0 : 1 )
for( k = firstScanIdSbb; k <= lastScanIdSbb; k++ )
{
    if( k == firstNonZero || ( k == lastScanIdSbb && inferSig1 == 1 ) ) {
        sig_flag[ k ] = 1
    } else {
        code sig_flag[ k ]    ← 16
    }
    if( sig_flag[ k ] )  ← 32  {
        inferSig1 = 0         ← 18
        code par_flag[ k ]    ← 24'
        code gt1_flag[ k ]
        state[ k ] = stateTransTab[ state[ k – 1 ] ][ 1 - par_flag[ k ] ]
    } else {
        par_flag[ k ] = 0
        gt1_flag[ k ] = 0
        state[ k ] = stateTransTab[ state[ k – 1 ] ][ 0 ]
    }
}

// second pass
for( k = firstScanIdSbb; k <= lastScanIdSbb; k++ )
{                            ← 34
    if( gt1_flag[ k ] )  {   ← 24"
        code gt2_flag[ k ]
    } else {
        gt2_flag[ k ] = 0
    }
}

// third pass: bypass bins of remainder
for( k = firstScanIdSbb; k <= lastScanIdSbb; k++ )
{
    if( gt2_flag[ k ] ) {          ← 28
        code remainder[ k ]
    } else {
        remainder[ k ] = 0
    }
}

// fourth pass: signs
for( k = minScanIdSbb; k <= maxScanIdSbb; k++ )
{
    if( sig_flag[ k ] ) {     ← 30
        code sign_flag[ k ]
    }
}
```

Labels at left: 22', 20, 22", 26, 27

Fig. 18

```
// first pass
inferSig1 = ( subblock includes DC coefficient ? 0 : 1 )
for( k = firstScanIdSbb; k <= lastScanIdSbb; k++ )
{
    if( k == firstNonZero || ( k == lastScanIdSbb && inferSig1 == 1 ) ) {
        sig_flag[ k ] = 1
    } else {
        code sig_flag[ k ]          ← 16
    }
    if( sig_flag[ k ] )  ← 32
    {
        inferSig1 = 0               ← 24'
        code gt1_flag[ k ]          ← 34
        if( gt1_flag[ k ] )
        {
            code par_flag[ k ]      ← 18
            code gt3_flag[ k ]      ← 24"
        } else {
            par_flag[ k ] = 0
            gt3_flag[ k ] = 0
        }
    } else {
        gt1_flag[ k ] = 0
        par_flag[ k ] = 0
        gt3_flag[ k ] = 0
    }
    parity = ( sig_flag[ k ] + gt1_flag[ k ] + par_flag[ k ] ) & 1 // modulo 2 of sum
    state[ k + 1 ] = stateTransTab( state[ k ] )[ parity ]
}

// second pass: bypass bins of remainder
for( k = firstScanIdSbb; k <= lastScanIdSbb; k++ )
{
    if( gt3_flag[ k ] ) {           ← 28
        code remainder[ k ]
    } else {
        remainder[ k ] = 0
    }
}

// third pass: signs
for( k = minScanIdSbb; k <= maxScanIdSbb; k++ )
{
    if( sig_flag[ k ] ) {           ← 30
        code sign_flag[ k ]
    }
}
```

20, 22 { (first pass block)
26 { (second pass block)
27 { (third pass block)

Fig. 19

```
// first pass: parity
for( k = firstScanIdSbb; k <= lastScanIdSbb; k++ ) {
    code par_flag[ k ]    ←—18
    state[ k ] = stateTransTab[ state[ k – 1 ] ][ par_flag[ k ] ]
}
```
20'

```
// second pass: significance
inferSig1 = ( subblock includes DC coefficient ? 0 : 1 )
for( k = firstScanIdSbb; k <= lastScanIdSbb; k++ ) {
    if( k == firstNonZero || ( k == lastScanIdSbb && inferSig1 == 1 )
            || par_flag[ k ]) {
        sig_flag[ k ] = 1
    } else {                    ←—16
        code sig_flag[ k ]
    }
}
```
20''

```
// third pass: gt1 bins
for( k = firstScanIdSbb; k <= lastScanIdSbb; k++ ) {
    if( sig_flag[ k ] ) {
        code gt1_flag[ k ]
    } else {                    ←—24'
        gt1_flag[ k ] = 0
    }
}
```
22'

```
// fourth pass: gt2 bins
for( k = firstScanIdSbb; k <= lastScanIdSbb; k++ ) {
    if( gt1_flag[ k ] ) {
        code gt2_flag[ k ]
    } else {                    ←—24''
        gt2_flag[ k ] = 0
    }
}
```
22''

```
// fifth pass: remainder
for( k = firstScanIdSbb; k <= lastScanIdSbb; k++ )
{
    if( gt2_flag[ k ] ) {       ←—28
        code remainder[ k ]
    } else {
        remainder[ k ] = 0
    }
}
```
26

```
// fourth pass: signs
for( k = minScanIdSbb; k <= maxScanIdSbb; k++ )
{
    if( sig_flag[ k ] ) {       ←—30
        code sign_flag[ k ]
    }
}
```
27

Fig. 20

ENTROPY CODING OF TRANSFORM COEFFICIENTS SUITABLE FOR DEPENDENT SCALAR QUANTIZATION

CROSS-REFERENCES TO RELATED APPLICATIONS

This application is a continuation of U.S. patent application Ser. No. 17/133,736, filed Dec. 24, 2020, pending, which is a continuation of PCT International Patent Application No. PCT/EP2019/067575, filed Jul. 1, 2019, which claims priority of European Patent Application No. 18181293.4, filed Jul. 2, 2018, which are all incorporated herein by reference in their entirety.

The present application is concerned with entropy coding of transform coefficient levels such as for coding a picture or a video.

BACKGROUND OF THE INVENTION

In setting a quantization parameter, the encoder has to make a compromise. Rendering the quantization coarse reduces the bitrate, but increases the quantization distortion, and rendering the quantization finer decreases the distortion, but increases the bitrate. It would be favorable to have a concept at hand which increases the coding efficiency for a given domain of available quantization levels. One such possibility is the usage of dependent quantization where the quantization is steadily adapted depending on previously quantized and coded data, but the dependency in quantization also influences the interrelationship between the data items to be quantized and coded and thus influences the availability of information for context adaptive entropy coding. It would be favorable to have a concept which enables coding of coefficients of a transform block in a manner suitable for dependent quantization and effectively implementable by entropy coding in terms of coding efficiency.

SUMMARY

An embodiment may have an apparatus for decoding a block of transform coefficients, configured to
  in one or more first passes of scanning the transform coefficients,
    decode, using context-adaptive entropy decoding, significance flags for the transform coefficients each of which indicates for a respective transform coefficient whether a quantization index of the respective transform coefficient is zero,
    decode parity flags for the transform coefficients each of which indicates for a respective transform coefficient a parity of the respective transform coefficient,
    decode, using context-adaptive entropy decoding, one or more greatness flags for each of transform coefficients the quantization index of which is not zero,
  in one or more further passes,
    decode, using equiprobability entropy decoding,
      a remainder of the quantization index of each of transform coefficients the one or more greatness flags of which are positive and
      a sign of the quantization index of each of the transform coefficients the quantization index of which is not zero.

Another embodiment may have an apparatus for encoding a block of transform coefficients, configured to
  in one or more first passes of scanning the transform coefficients,
    encode, using context-adaptive entropy encoding, significance flags for the current transform coefficients each of which indicates for a respective transform coefficient whether a quantization index of the respective current transform coefficients is zero,
    encode parity flags for the transform coefficients each of which indicates for a respective transform coefficient a parity of the respective transform coefficients,
    encode, using context-adaptive entropy encoding, one or more greatness flags for each of transform coefficients the quantization index of which is not zero,
  in one or more further passes,
    encode, using equiprobability entropy encoding,
      a remainder of the quantization index of each of transform coefficients the one or more greatness flags of which are positive and
      a sign of the quantization index of each of the transform coefficients the quantization index of which is not zero.

Yet another embodiment may have a method for decoding a block of transform coefficients, configured to
  in one or more first passes of scanning the transform coefficients,
    decode, using context-adaptive entropy decoding, significance flags for the transform coefficients each of which indicates for a respective transform coefficient whether a quantization index of the respective transform coefficients is zero,
    decode parity flags for the transform coefficients each of which indicates for a respective transform coefficient a parity of the respective transform coefficients,
    decode, using context-adaptive entropy decoding, one or more greatness flags for each of transform coefficients the quantization index of which is not zero,
  in one or more further passes,
    decode, using equiprobability entropy decoding,
      a remainder of the quantization index of each of transform coefficients the one or more greatness flags of which are positive and
      a sign of the quantization index of each of the transform coefficients the quantization index of which is not zero.

Still another embodiment may have a method for encoding a block of transform coefficients, configured to
  in one or more first passes of scanning the transform coefficients,
    encode, using context-adaptive entropy encoding, significance flags for the current transform coefficients each of which indicates for a respective transform coefficient whether a quantization index of the respective current transform coefficients is zero,
    encode parity flags for the transform coefficients each of which indicates for a respective transform coefficient a parity of the respective transform coefficients,
    encode, using context-adaptive entropy encoding, one or more greatness flags for each of transform coefficients the quantization index of which is not zero,
  in one or more further passes,
    encode, using equiprobability entropy encoding,
      a remainder of the quantization index of each of transform coefficients the one or more greatness flags of which are positive and a sign of the quantization index of each of the transform coefficients the quantization index of which is not zero.

According to another embodiment, a non-transitory digital storage medium may have a computer program stored thereon to perform the inventive methods, when said computer program is run by a computer.

Yet another embodiment may have a data stream generated by an inventive method.

BRIEF DESCRIPTION OF THE DRAWINGS

Embodiments of the present invention will be detailed subsequently referring to the appended drawings, in which:

FIGS. 5a-5b show a schematic diagram of a multi-dimensional output space spanned by one axis per transform coefficient, and the location of admissible reconstruction vectors for the simple case of two transform coefficients: (a) Independent scalar quantization; (b) an example for dependent scalar quantization.

FIG. 6 shows a block diagram of a transform decoder using dependent scalar quantization, thereby forming an embodiment of a media decoder according to the present application. Modifications relative to conventional transform coding (with independent scalar quantizers) are derivable by comparison to FIG. 2b. In a corresponding manner, embodiments for encoding a transform block using dependent scalar quantization, may be obtained by modifying the encoder of FIG. 2a likewise.

FIG. 15 shows a pseudo-code illustrating a comparison example for the coding of transform coefficient levels for a block of coefficients such as a subblock which may be easily transferred onto decoding a transform block not divided into subblocks and onto decoding of the coefficients (namely by replacing "code" by "decode". Here, on pass is used to code all flags and remainder for the coefficients except the sign flags.

FIG. 18 shows a pseudo-code illustrating an embodiment for the coding of transform coefficient levels for a block of coefficients such as a subblock which may be easily transferred onto decoding a transform block not divided into subblocks and onto decoding of the coefficients (namely by replacing "code" by "decode". Here, on pass is used to code all flags and remainder for the coefficients except the sign flags. Here, the common pass of FIG. 15, is split into three passes.

FIG. 19 shows a pseudo-code illustrating an embodiment for the coding of transform coefficient levels for a block of coefficients such as a subblock which may be easily transferred onto decoding a transform block not divided into subblocks and onto decoding of the coefficients (namely by replacing "code" by "decode". Here, on pass is used to code all flags and remainder for the coefficients except the sign flags. Here, the common pass of FIG. 15, is split into two passes, one for the remainder, the other for the flags other than the sign flag.

FIG. 20 shows a pseudo-code illustrating an embodiment for the coding of transform coefficient levels for a block of coefficients such as a subblock which may be easily transferred onto decoding a transform block not divided into subblocks and onto decoding of the coefficients (namely by replacing "code" by "decode". Here, on pass is used to code all flags and remainder for the coefficients except the sign flags. Here, the common pass of FIG. 15, is split into several passes and the parity flags are coded before the absolute levels or coded before any other flag, respectively.

DETAILED DESCRIPTION OF THE INVENTION

Figure 1:
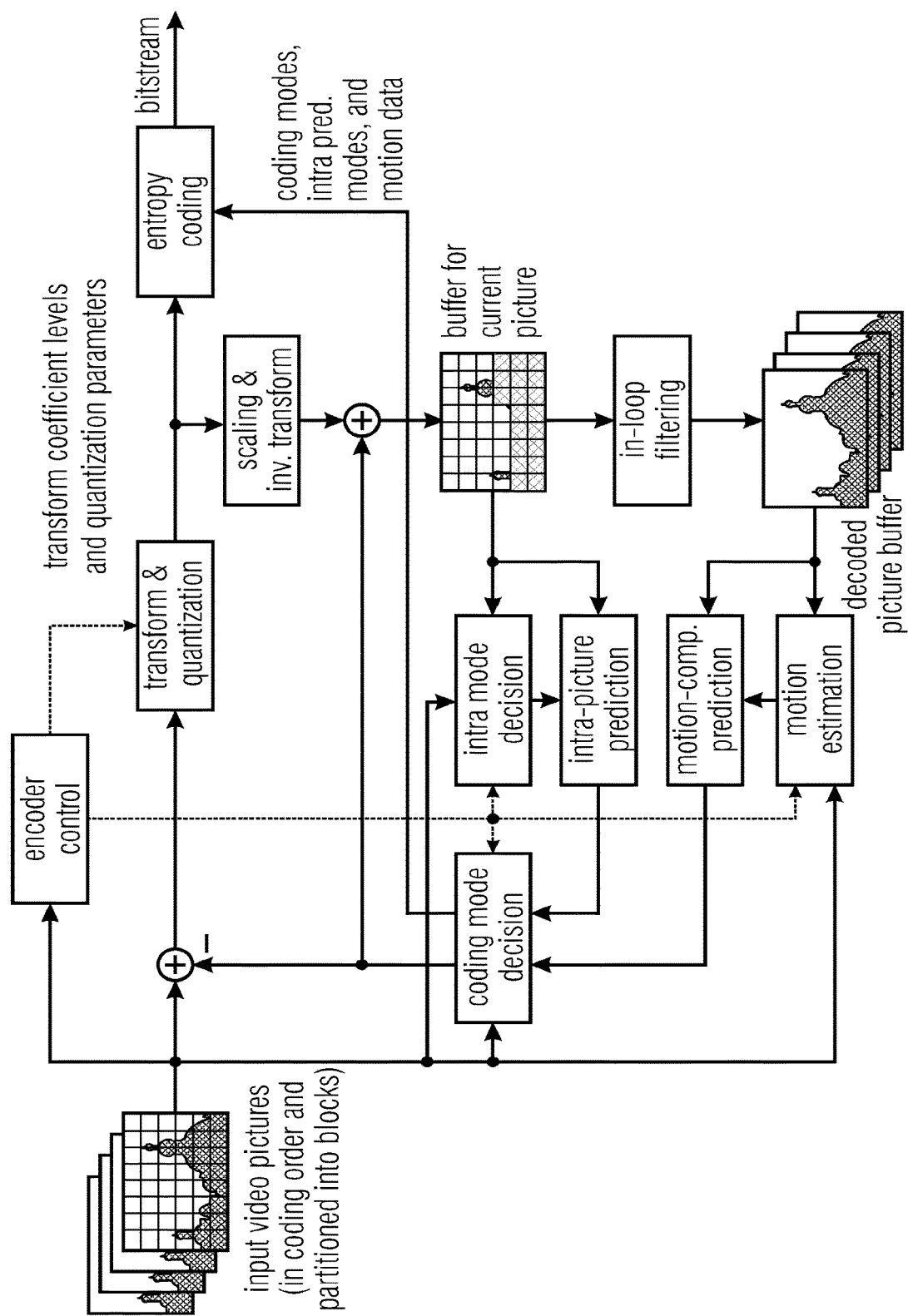
FIG. 1 shows a block diagram of an exemplary video encoder as an example for a picture encoder which may be embodied to operate in accordance with any of the embodiments described below.

In accordance with the embodiments described next, entropy coding of transform coefficient levels is done in a manner suitable for an effective implementation along with dependent quantization and context adaptive entropy coding such as context adaptive binary arithmetic coding. The embodiments are particularly advantageous for entropy coding of transform coefficient levels in the context of transform coding with dependent scalar quantization. However, they are also useable and advantageous if used along with conventional independent scalar quantization. That is, they are also applicable for entropy coding of transform coefficient levels in the context of transform coding with conventional independent scalar quantization. Moreover, embodiments described hereinbelow are applicable for codecs that support a switch (e.g., on a sequence, picture, slice, tile, or block level) between transform coding with dependent quantization and transform coding with conventional independent quantization.

In the embodiments described below, transform coding is used to transform a set of samples. Quantization, which may be embodied as dependent scalar quantization, or, alternatively, as independent scalar quantization, is used to quantize the resulting transform coefficients, and an entropy coding of the obtained quantization indexes takes place. At the decoder side, the set of reconstructed samples is obtained by entropy decoding of the quantization indexes, a dependent reconstruction (or, alternatively, an independent reconstruction) of transform coefficients, and an inverse transform. The difference between dependent scalar quantization and conventional independent scalar quantization is that, for dependent scalar quantization, the set of admissible reconstruction levels for a transform coefficient depends on the transmitted transform coefficient levels that precede the current transform coefficient in reconstruction order. This aspect is exploited in entropy coding by using different sets of probability models for different sets of admissible reconstruction levels. In order to enable efficient hardware implementations, the binary decisions (referred to as bins) related to the transform coefficient levels of a block or subblock are coded in multiple passes. The binarization of the transform coefficient levels and the distribution of the binary decisions (also referred to as bins) over the multiple passes is chosen in a way that the data coded in the first pass uniquely determine the set of admissible reconstruction levels for the next scan position. This has the advantage that the probability models for a part of the bins in the first pass can be selected depending on set of admissible reconstruction levels (for a corresponding transform coefficient).

The description of embodiments below is mainly targeted on a lossy coding of blocks of prediction error samples in image and video codecs, but the embodiments can also be applied to other areas of lossy coding. In particular, no restriction to sets of samples that form rectangular blocks exists and there is no restriction to sets of samples that represent prediction error samples (i.e., differences between an original and a prediction signal) either.

All state-of-the-art video codecs, such as the international video coding standards H.264|MPEG-4 AVC and H.265|MPEG-H HEVC follow the basic approach of hybrid video coding. The video pictures are partitioned into blocks, the samples of a block are predicted using intra-picture prediction or inter-prediction, and the samples of the resulting prediction error signal (difference between the original samples and the samples of the prediction signal) are coded using transform coding.

FIG. 1 shows a simplified block diagram of a typical modern video encoder. The video pictures of a video sequence are coded in a certain order, which is referred to as coding order. The coding order of pictures can differ from the capture and display order. For the actual coding, each video picture is partitioned into blocks. A block comprises the samples of a rectangular area of a particular color component. The entity of the blocks of all color components that correspond to the same rectangular area is often referred to as unit. Depending on the purpose of the block partitioning, in H.265|MPEG-H HEVC, it is distinguished between coding tree blocks (CTBs), coding blocks (CBs), prediction blocks (PBs), and transform blocks (TBs). The associated units are referred to as coding tree units (CTUs), coding units (CUs), prediction units (PUs), and transform units (TUs).

Typically, a video picture is initially partitioned into fixed sized units (i.e., aligned fixed sized blocks for all color components). In H.265|MPEG-H HEVC, these fixed sized units are referred to as coding tree units (CTUs). Each CTU can be further split into multiple coding units (CUs). A coding unit is the entity for which a coding mode (for example, intra- or inter-picture coding) is selected. In H.265|MPEG-H HEVC, the decomposition of a CTU into one or multiple CUs is specified by a quadtree (QT) syntax and transmitted as part of the bitstream. The CUs of a CTU are processed in the so-called z-scan order. That means, the four blocks that result from a split are processed in raster-scan order; and if any of the blocks is further partitioned, the corresponding four blocks (including the included smaller blocks) are processed before the next block of the higher splitting level is processed.

If a CU is coded in an intra-coding mode, an intra prediction mode for the luma signal and, if the video signal includes chroma components, another intra prediction mode for the chroma signals is transmitted. In ITU-T H.265|MPEG-H HEVC, if the CU size is equal to the minimum CU size (as signaled in the sequence parameter set), the luma block can also be split into four equally sized blocks, in which case, for each of these blocks, a separate luma intra prediction mode is transmitted. The actual intra prediction and coding is done on the basis of transform blocks. For each transform block of an intra-picture coded CU, a prediction signal is derived using already reconstructed samples of the same color component. The algorithm that is used for generating the prediction signal for the transform block is determined by the transmitted intra prediction mode.

CUs that are coded in inter-picture coding mode can be further split into multiple prediction units (PUs). A prediction unit is the entity of a luma and, for color video, two associated chroma blocks (covering the same picture area), for which a single set of prediction parameters is used. A CU can be coded as a single prediction unit, or it can be split into two non-square (symmetric and asymmetric splittings are supported) or four square prediction units. For each PU, an individual set of motion parameters is transmitted. Each set of motion parameters includes the number of motion hypotheses (one or two in H.265|MPEG-H HEVC) and, for each motion hypothesis, the reference picture (indicated via a reference picture index into a list of reference pictures) and the associated motion vector. In addition, H.265|MPEG-H HEVC provides a so-called merged mode, in which the motion parameters are not explicitly transmitted, but derived based on motion parameters of spatial or temporal neighboring blocks. If a CU or PU is coded in merge mode, only an index into a list of motion parameter candidates (this list is derived using motion data of spatial and temporal neighboring blocks) is transmitted. The index completely determines the set of motion parameters used. The prediction signal for inter-coded PUs is formed by motion-compensated prediction. For each motion hypothesis (specified by a reference picture and a motion vector), a prediction signal is formed by a displaced block in the specified reference picture, where the displacement relative to the current PU is specified by the motion vector. The displacement is typically specified with sub-sample accuracy (in H.265|MPEG-H HEVC, the motion vectors have a precision of a quarter luma sample). For non-integer motion vectors, the prediction signal is generated by interpolating the reconstructed reference picture (typically, using separable FIR filters). The final prediction signal of PUs with multi-hypothesis prediction is formed by a weighted sum of the prediction signals for the individual motion hypothesis. Typically, the same set of motion parameters is used for luma and chroma blocks of a PU. Even though state-of-the-art video coding standards use translational displacement vectors for specifying the motion of a current area (block of samples) relative to a reference picture, it is also possible to employ higher-order motion models (for example, the affine motion model). In that case, additional motion parameters have to be transmitted for a motion hypothesis.

For both intra-picture and inter-picture coded CUs, the prediction error signal (also called residual signal) is typically transmitted via transform coding. In H.265|MPEG-H HEVC, the block of luma residual samples of a CU as well as the blocks of chroma residual samples (if present) are partitioned into transform blocks (TBs). The partitioning of a CU into transform block is indicated by a quadtree syntax, which is also referred to as residual quadtree (RQT). The resulting transform blocks are coded using transform coding: A 2d transform is applied to the block of residual samples, the resulting transform coefficients are quantized using independent scalar quantization, and the resulting transform coefficient levels (quantization indexes) are entropy coded. In P and B slices, at the beginning of the CU syntax, a skip_flag is transmitted. If this flag is equal to 1, it indicates that the corresponding CU consists of a single prediction unit coded in merge mode (i.e., merge_flag is inferred to be equal to 1) and that all transform coefficients are equal to zero (i.e., the reconstruction signal is equal to the prediction signal). In that case, only the merge_idx is transmitted in addition to the skip_flag. If skip_flag is equal to 0, the prediction mode (inter or intra) is signaled, followed by the syntax features described above.

Since already coded pictures can be used for motion-compensated prediction of blocks in following pictures, the pictures have to be fully reconstructed in the encoder. The reconstructed prediction error signal for a block (obtained by reconstructing the transform coefficients given the quantization indexes and an inverse transform) is added to the corresponding prediction signal and the result is written to a buffer for the current picture. After all blocks of a picture are reconstructed, one or more in-loop filters can be applied (for example, a deblocking filter and a sample adaptive offset filter). The final reconstructed picture is then stored in a decoded picture buffer.

The embodiments described below present a concept for transform coding such as the transform coding of prediction error signals. The concept is applicable for both intra-picture and inter-picture coded blocks. It is also applicable to transform coding of non-rectangular sample regions. In contrast to conventional transform coding, the transform coefficients are, according to embodiments described below, not independently quantized. At least, they lend itself to be quantized using dependent quantization. According to dependent quantization, the set of available reconstruction levels for a particular transform coefficient depends on the chosen quantization indexes for other transform coefficients. Modifications for the entropy coding of quantization indexes are described below, which increase the coding efficiency and maintain capability of being combined with dependent scalar quantization.

All major video coding standards (including the state-of-the-art standard H.265|MPEG-H HEVC) utilize the concept of transform coding for coding blocks of prediction error samples. The prediction error samples of a block represent the differences between the samples of the original signal and the samples of a prediction signal for the block. The prediction signal is either obtained by intra-picture prediction (in which case the samples of the prediction signal for a current block are derived based on already reconstructed samples of neighboring blocks inside the same picture) or by inter-picture prediction (in which case the samples of the prediction signal are derived based on samples of already reconstructed pictures). The samples of the original prediction error signal are obtained by subtracting the values of the samples of the prediction signal from the samples values of the original signal for the current block.

Figure 2A:
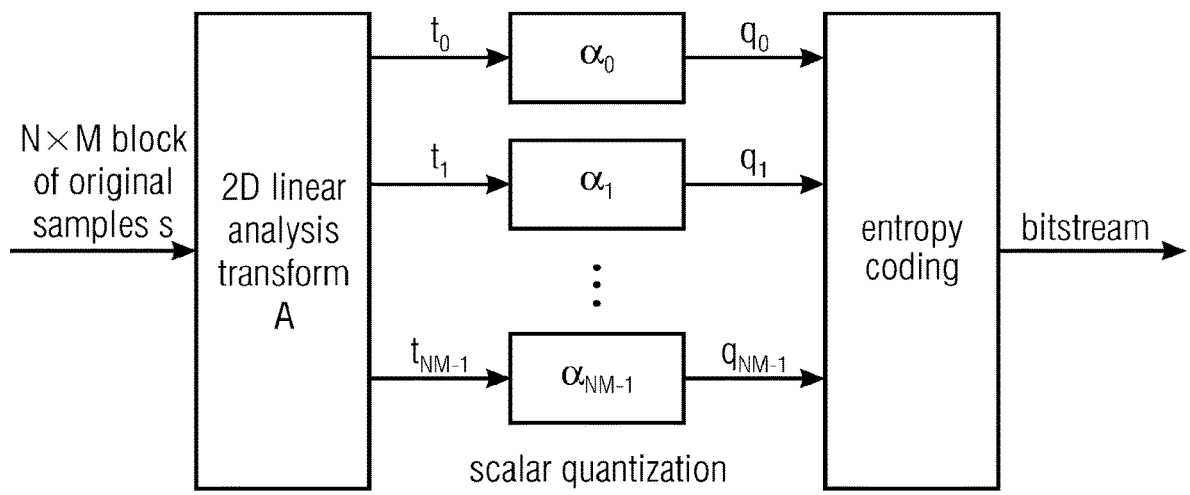
FIGS. 2a-2b show a block diagram of (a) a transform encoder; and (b) a transform decoder to illustrate a basic approach of block-based transform coding.

Transform coding of sample blocks consists of a linear transform, scalar quantization, and entropy coding of the quantization indexes. At the encoder side (see FIG. 2a), an N×M block of original samples is transformed using a linear analysis transform A. The result is an N×M block of transform coefficients. The transform coefficients $t_k$ represent the original prediction error samples in a different signal space (or different coordinate system). The N×M transform coefficients are quantized using N×M independent scalar quantizers. Each transform coefficient $t_k$ is mapped to a quantization index $q_k$, which is also referred to as transform coefficient level. The obtained quantization indexes $q_k$ are entropy coded and written to the bitstream.

Figure 2B:
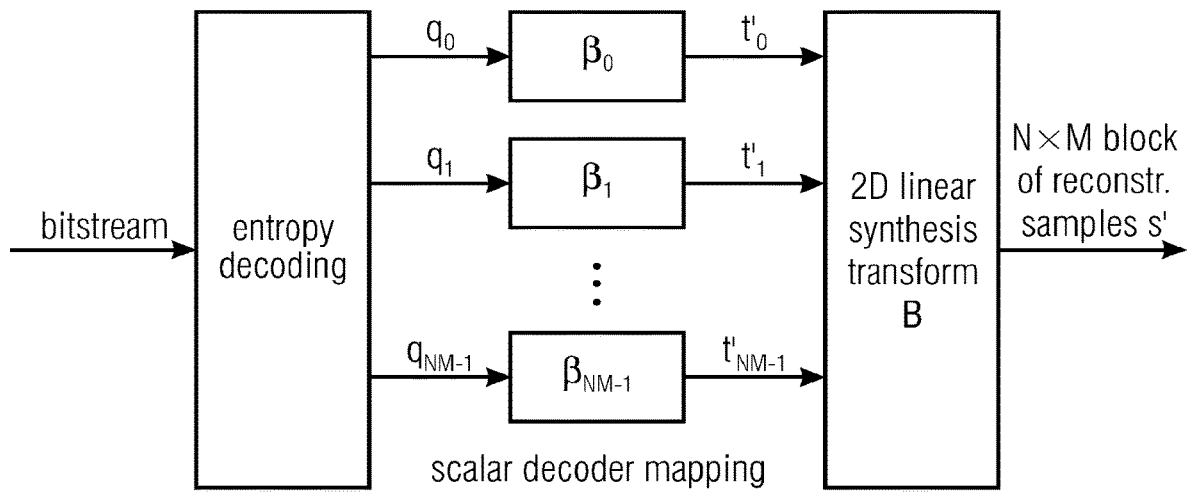

At the decoder side, which is depicted in FIG. 2b, the transform coefficient levels $q_k$ are decoded from the received bitstream. Each transform coefficient level $q_k$ is mapped to a reconstructed transform coefficient $t'_k$. The N×M block of reconstructed samples is obtained by transforming the block of reconstructed transform coefficients using a linear synthesis transform B.

Even though video coding standards only specify the synthesis transform B, it is common practice that the inverse of the synthesis transform B is used as analysis transform A in an encoder, i.e., $A=B^{-1}$. Moreover, the transforms used in practical video coding systems represent orthogonal transforms ($B^{-1}=B^T$) or nearly orthogonal transforms. For orthogonal transforms, the mean squared error (MSE) distortion in the signal space is equal to the MSE distortion in the transform domain. The orthogonality has the important advantage that the MSE distortion between an original and reconstructed sample block can be minimized using independent scalar quantizers. Even if the actual quantization process used in an encoder takes dependencies between transform coefficient levels (introduced by the entropy coding description above) into account, the usage of orthogonal transforms significantly simplifies the quantization algorithm.

For typical prediction error signals, the transform has the effect that the signal energy is concentrated in a few transform coefficients. In comparison to the original prediction error samples, the statistical dependencies between the resulting transform coefficients are reduced.

In state-of-the-art video coding standards, a separable discrete cosine transform (type II) or an integer approximation thereof is used. The transform can, however, be easily replaced without modifying other aspects of the transform coding system. Examples for improvements that have been suggested in the literature or in standardization documents include:

Usage of discrete sine transform (DST) for intra-picture predicted blocks (possibly depending on the intra prediction mode and/or the block size). Note that H.265|MPEG-H HEVC already includes a DST for intra-picture predicted 4×4 transform blocks.

Switched transforms: The encoder selects the actually used transform among a set of pre-defined transforms. The set of available transforms is known by both the encoder and the decoder, so that it can be efficiently signaled using an index into a list of available transforms. The set of available transforms and their ordering in a list can depend on other coding parameters for the block, such as the chosen intra prediction mode. In a special case, the used transform is completely determined by coding parameters such as the intra prediction mode, so that no syntax element for specifying the transform needs to be transmitted.

Non-separable transforms: The transforms used in encoder and decoder represent non-separable transforms. Note that the concept of switched transforms may include one or more non-separable transforms. Due to complexity reasons, the usage of non-separable transforms can be restricted to certain block sizes.

Multi-level transforms: The actual transform is composed of two or more transform stages. The first transform stage could consist of a computationally low-complex separable transform. And in the second stage a subset of the resulting transform coefficients is further transformed using a non-separable transform. It comparison to a non-separable transform for the entire transform block, the two-stage approach has the advantage that the more complex non-separable transform is applied to a smaller number of samples. The concept of multi-level transforms can be efficiently combined with the concept of switched transforms.

The transform coefficients are quantized using scalar quantizers. As a result of the quantization, the set of admissible values for the transform coefficients is reduced. In other words, the transform coefficients are mapped to a countable set (in practice, a finite set) of so-called reconstruction levels. The set of reconstruction levels represents a proper subset of the set of possible transform coefficient values. For simplifying the following entropy coding, the admissible reconstruction levels are represented by quantization indexes (also referred to as transform coefficient levels), which are transmitted as part of the bitstream. At the decoder side, the quantization indexes (transform coefficient levels) are mapped to reconstructed transform coefficients. The possible values for the reconstructed transform coefficients correspond to the set of reconstruction levels. At the encoder side, the result of scalar quantization is a block of transform coefficient levels (quantization indexes).

Figure 3:
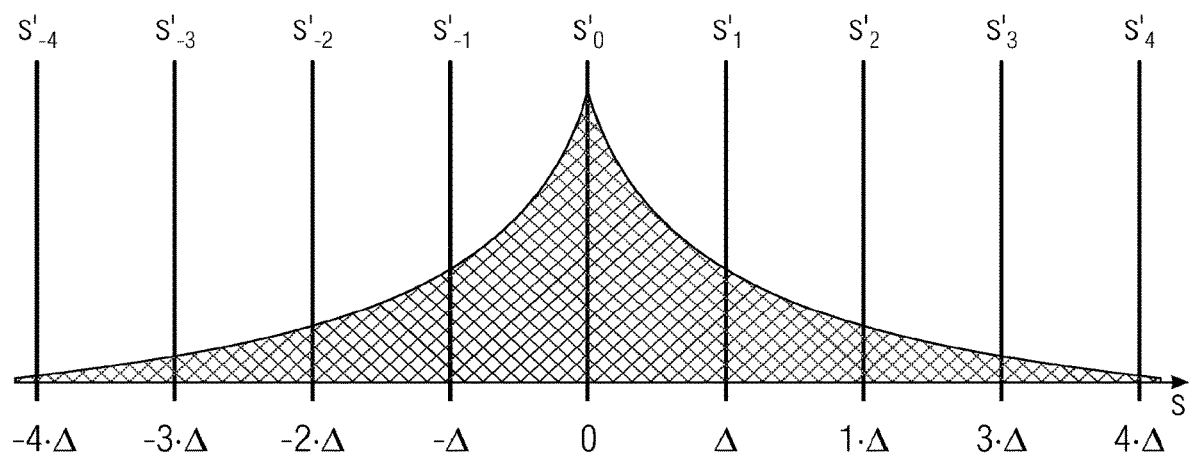
FIG. 3 shows a histogram of a distribution illustrating a uniform reconstruction quantizer.

In state-of-the-art video coding standards, uniform reconstruction quantizers (URQs) are used. Their basic design is illustrated in FIG. 3. URQs have the property that the reconstruction levels s are equally spaced. The distance Δ between two neighboring reconstruction levels is referred to as quantization step size. One of the reconstruction levels is equal to 0. Hence, the complete set of available reconstruction levels is uniquely specified by the quantization step size Δ. The decoder mapping of quantization indexes q to reconstructed transform coefficients t' is, in principle, given by the simple formula t'=q Δ.

In this context, the term "independent scalar quantization" refers to the property that, given the quantization index q for any transform coefficient, the associated reconstructed transform coefficient t' can be determined independently of all quantization indexes for the other transform coefficients.

Since video decoders typically utilize integer arithmetic with standard precision (e.g., 32 bits), the actual formula used in the standard can slightly differ from the simple multiplication. When neglecting the clipping to the supported dynamic range for the transform coefficients, the reconstructed transform coefficients in H.265|MPEG-H HEVC are obtained by $$t'=(\text{scale}\cdot q+(1<<(\text{shift}-1)))>>\text{shift},$$

where the operators "<<" and ">>" represent bit shifts to the left and right, respectively. When we ignore the integer arithmetic, the quantization step size Δ corresponds to the term $$\Delta=\text{scale}\cdot 2^{-\text{shift}}.$$

Older video coding standards, such as H.262|MPEG-2 Video, also specify modified URQs for which the distances between the reconstruction level zero and the first non-zero reconstruction levels are increased relative to the nominal quantization step size (e.g., to three halves of the nominal quantization step size Δ).

The quantization step size (or the scale and shift parameters) for a transform coefficient is determined by two factors:

Quantization parameter QP: The quantization step size can typically be modified on a block basis. For that purpose, video coding standards provide a predefined set of quantization step sizes. The used quantization step size (or, equivalently the parameters "scale" and "shift" introduced above) is indicated using an index into the predefined list of quantization step sizes. The index is called quantization parameter (QP). In H.265|MPEG-H HEVC, the relationship between QP and the quantization step size is approximately given by $$\Delta \approx const \cdot 2^{\frac{QP}{6}}.$$

A slice QP is typically transmitted in the slice header. In general, it is possible to modify the quantization parameter QP on the basis of blocks. For that purpose, a DQP (delta quantization parameter) can be transmitted. The used quantization parameter is determined by the transmitted DQP and a predicted QP value, which is derived using the QPs of already coded (typically neighboring) blocks.

Quantization weighting matrix: Video coding standards often provide the possibility to use different quantization step sizes for individual transform coefficients. This is achieved by specifying so-called quantization weighting matrices w, which can be selected by the encoder, typically on a sequence or picture level, and are transmitted as part of the bitstream. A quantization weighting matrix w has the same size as the corresponding block of transform coefficients. The quantization step size $\Delta_{ik}$ for a transform coefficient $t_{ik}$ is given by $$\Delta_{ik} = w_{ik} \cdot \Delta_{block},$$

where $\Delta_{block}$ denotes the quantization step size (indicated by the block quantization parameter QP) for the considered block, i and k represent the coordinates specifying the current transform coefficient inside the transform block, and $w_{ik}$ represents the corresponding entry in the quantization weighting matrix w.

The main intention of quantization weighting matrices is to provide a possibility for introducing the quantization noise in a perceptual meaningful way. By using appropriate weighting matrices, the spatial contrast sensitivity of human vision can be exploited for achieving a better trade-off between bit rate and subjective reconstruction quality. Nonetheless, many encoders use a so-called flat quantization matrix (which can be efficiently transmitted using high-level syntax elements). In this case, the same quantization step size Δ is used for all transform coefficients in a block. The quantization step size is then completely specified by the quantization parameter QP.

The block of transform coefficient levels (quantization indexes for the transform coefficients) are entropy coded (i.e., it is transmitted in a lossless manner as part of the bitstream). Since the linear transform can only reduce linear dependencies, the entropy coding for the transform coefficient levels is typically designed in a way that remaining non-linear dependencies between transform coefficient levels in a block can be exploited for an efficient coding. Well known examples are the run-level coding in MPEG-2 Video, the run-level-last coding in H.263 and MPEG-4 Visual, the context-adaptive variable length coding (CAVLC) in H.264|MPEG-4 AVC, and context-based adaptive binary arithmetic coding (CABAC) in H.264|MPEG-4 AVC and H.265|MPEG-H HEVC.

Figure 4A:
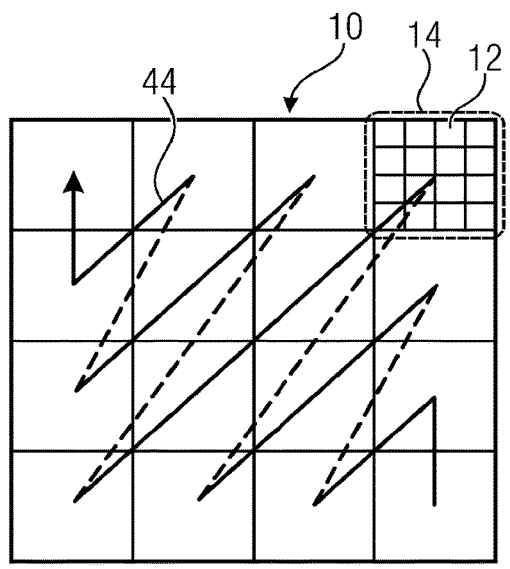
FIGS. 4a-4b show a schematic diagram of (a) a transform block subdivided into subblocks and (b) a subblock in order to illustrate an example for scanning of transform coefficient levels, here exemplarily one used in H.265|MPEG-H HEVC; in particular, (a) shows a partitioning of a 16×16 transform block into 4×4 subblocks and the coding order of subblocks; (b) shows the coding order of transform coefficient levels inside a 4×4 subblock. The sub-divisioning may exemplarily be used in embodiments of the present application, for the passes of the coefficients in decoding their flags and remainders and for the state transitioning in dequantizing same.
Figure 4B:
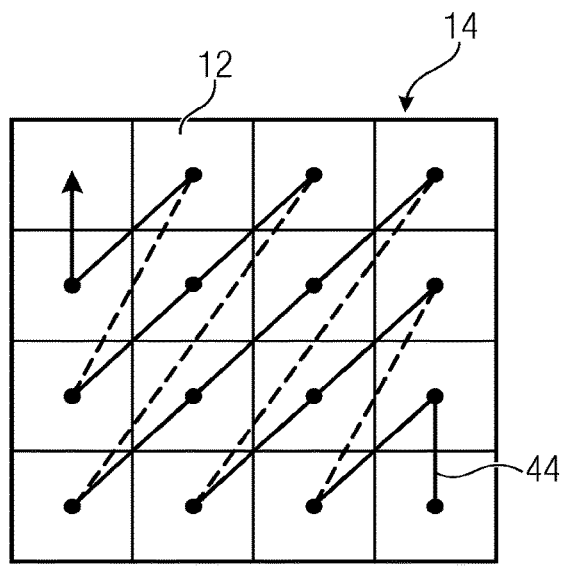

The CABAC specified in the state-of-the-art video coding standard H.265|MPEG-H HEVC follows a generic concept that can be applied for a large variety of transform block sizes. Transform blocks that are larger than 4×4 samples are partitioned into 4×4 subblocks. The partitioning is illustrated in FIGS. 4a and b for the example of a 16×16 transform block. The coding order of the 4×4 subblocks, shown in FIG. 4a, as well as the coding order of the transform coefficient levels inside a subblock, shown in FIG. 4b, are, in general, specified by the reverse diagonal scan shown in the figures. For certain intra-picture predicted blocks, a horizontal or vertical scan pattern is used (depending on the actual intra prediction mode). The coding order starts with high-frequency locations.

In H.265|MPEG-H HEVC, the transform coefficient levels are transmitted on the basis of 4×4 subblocks. The lossless coding of transform coefficient levels includes the following steps:

1. A syntax element coded_block_flag is transmitted, which signals whether there are any non-zero transform coefficient levels in the transform block. If coded_block_flag is equal to 0, no further data are coded for the transform block.

2. The x and y coordinates of the first non-zero transform coefficient level in coding order (e.g., the block-wise reverse diagonal scan order illustrated in FIG. 4) are transmitted. The transmission of the coordinates is split into a prefix and suffix part. The standard uses the syntax elements last_sig_coeff_x_prefix, last_sig_coeff_y_prefix, last_sig_coeff_x_suffix, and last_sig_coeff_x_suffix.

3. Starting with the 4×4 subblock that contains the first non-zero transform coefficient level in coding order, the 4×4 subblocks are processed in coding order, where the coding of a subblock includes the following main steps:

a. A syntax element coded_sub_block_flag is transmitted, which indicates whether the subblock contains any non-zero transform coefficient levels. For the first and last 4×4 subblock (i.e., the subblocks that contain the first non-zero transform coefficient level or the DC level), this flag is not transmitted but inferred to be equal to one.

b. For all transform coefficient levels inside a subblock with coded_sub_block_flag equal to one, the syntax element significant_coeff_flag indicates whether the corresponding transform coefficient level is not equal to zero. This flag is only transmitted if its value cannot be inferred based on already transmitted data. In particular, the flag is not transmitted for the first significant scan position (specified by the transmitted x and y coordinates) and it is not transmitted for the DC coefficient if the DC coefficient is located in a different subblock than the first non-zero coefficient (in coding order) and all other significant_coeff_flags for the last subblock are equal to zero.

c. For the first eight transform coefficient levels with significant_coeff_flag equal to one (if any), the flag coeff_abs_level_greater1_flag is transmitted. It indicates whether the absolute value of the transform coefficient level is greater than one.

d. For the first transform coefficient level with coeff_abs_level_greater1_flag equal to one (if any), the flag coeff_abs_level_greater2_flag is transmitted. It indicates whether the absolute value of the transform coefficient level is greater than two.

e. For all levels with significant_coeff_flag equal to one (an exception is described below), the syntax element coeff_sign_flag is transmitted, which specifies the sign of the transform coefficient level.

f. For all transform coefficient levels for which the absolute value is not already completely specified by the values of significant_coeff_flag, coeff_abs_level_greater1_flag and coeff_abs_level_greater2_flag (the absolute value is completely specified if any of the transmitted flags is equal to zero), the remainder of the absolute value is transmitted using the multi-level syntax element coeff_abs_level_remaining.

In H.265|MPEG-H HEVC, all syntax elements are coded using context-based adaptive binary arithmetic coding (CABAC). All non-binary syntax elements are first mapped onto a series of binary decisions, which are also referred to as bins. The resulting bin sequence is coded using binary arithmetic coding. For that purpose, each bin is associated with a probability model (binary probability mass function), which is also referred to as a context. For most bins, the context represents an adaptive probability model, which means that the associated binary probability mass function is updated based on the actually coded bin values. Conditional probabilities can be exploited by switching the contexts for certain bins based on already transmitted data. CABAC also includes a so-called bypass mode, in which the fixed probability mass function (0.5, 0.5) is used.

The context that is chosen for the coding of the coded_sub_block_flag depends on the values of coded_sub_block_flag for already coded neighboring subblocks. The context for the significant_coeff_flag is selected based on the scan position (x and y coordinate) inside a subblock, the size of the transform block, and the values of coded_sub_block_flag in neighboring subblocks. For the flags coeff_abs_level_greater1_flag and coeff_abs_level_greater2_flag, the context selection depends on whether the current subblock includes the DC coefficient and whether any coeff_abs_level_greater1_flag equal to one has been transmitted for the neighboring subblocks. For the coeff_abs_level_greater1_flag, it further depends on the number and the values of the already coded coeff_abs_level_greater1_flag's for the subblock.

The signs coeff_sign_flag and the remainder of the absolute values coeff_abs_level_remaining are coded in the bypass mode of the binary arithmetic coder. For mapping coeff_abs_level_remaining onto a sequence of bins (binary decisions), an adaptive binarization scheme is used. The binarization is controlled by a single parameter, which is adapted based on already coded values for the subblock.

H.265|MPEG-H HEVC also includes a so-called sign data hiding mode, in which (under certain conditions) the transmission of the sign for that last non-zero level inside a subblock is omitted. Instead, the sign for this level is embedded in the parity of the sum of the absolute values for the levels of the corresponding subblock. Note that the encoder has to consider this aspect in determining appropriate transform coefficient levels.

Video coding standards only specify the bitstream syntax and the reconstruction process. If we consider transform coding for a given block of original prediction error samples and given quantization step sizes, the encoder has a lot a freedom. Given the quantization indexes $q_k$ for a transform block, the entropy coding has to follow a uniquely defined algorithm for writing the data to the bitstream (i.e., constructing the arithmetic codeword). But the encoder algorithm for obtaining the quantization indexes $q_k$ given an original block of prediction error samples is out of the scope of video coding standards. Furthermore, the encoder has the freedom to select a quantization parameter QP on a block basis. For the following description, we assume that the quantization parameter QP and the quantization weighting matrix are given. Hence, the quantization step size for each transform coefficient is known. We further assume that the encoder performs an analysis transform that is the inverse (or a very close approximation of the inverse) of the specified synthesis transform for obtaining original transform coefficients $t_k$. Even under these conditions, the encoder has the freedom to select a quantizer index $q_k$ for each original transform coefficient $t_k$. Since the selection of transform coefficient levels determines both the distortion (or reconstruction/approximation quality) and the bit rate, the quantization algorithm used has a substantial impact on the rate-distortion performance of the produced bitstream.

The simplest quantization method rounds the original transform coefficients $t_k$ to the nearest reconstruction levels. For the typically used URQs, the corresponding quantization index $q_k$ can be determined according to $$q_k = sgn(t_k) \cdot \left\lfloor \frac{|t_k|}{\Delta_k} + \frac{1}{2} \right\rfloor,$$

where sgn( ) is the sign function and the operator $\lfloor \cdot \rfloor$ returns the largest integer that is smaller or equal to its argument. This quantization methods guarantees that the MSE distortion $$D = \sum_k D_k = \sum_k (t_k - q_k \cdot \Delta_k)^2$$

is minimized, but it completely ignores the bit rate that may be used for transmitting the resulting transform coefficient levels $q_k$. Typically, better results are obtained if the rounding is biased towards zero:

$$q_k = sgn(t_k) \cdot \left\lfloor \frac{|t_k|}{\Delta_k} + a \right\rfloor \text{ with } 0 \le a < \frac{1}{2}.$$

The best result in rate-distortion sense is obtained if the quantization process minimizes a Lagrangian function $D+\lambda \cdot R$, where D represent the distortion (e.g., MSE distortion) of the transform block, R specifies the number of bits that may be used for transmitting the transform coefficient levels of the block, and $\lambda$ is a Lagrange multiplier. For codecs that use the relationship $$\Delta \approx const \cdot 2^{\frac{QP}{6}}$$

between OH and quantization step size (such as H.264|MPEG-4 AVC or H.265|MPEG-H HEVC), the following relationship between the Lagrange multiplier 2 and the block quantization parameter QP is often used $$\lambda = c_1 \cdot \Delta^2 = c_2 \cdot 2^{\frac{QP}{3}},$$

where $c_1$ and $c_2$ represent constant factors for a slice or picture.

Quantization algorithms that aim to minimize a Lagrange function $D+\lambda \cdot R$ of distortion and rate are also referred to as rate-distortion optimized quantization (RDOQ). If we measure the distortion using the MSE or a weighted MSE, the quantization indexes $q_k$ for a transform block should be determined in a way so that the following cost measure is minimized:

$$D + \lambda \cdot R = \sum_k \alpha_k \cdot (t_k - \Delta_k \cdot q_k)^2 + \lambda \cdot R(q_k \mid q_{k-1}, q_{k-2}, \ldots).$$

At this, the transform coefficient index k specifies the coding order (or scanning order) of transform coefficient levels. The term $R(q_k | q_{k-1}, q_{k-2}, \ldots)$ represents the number of bits (or an estimate thereof) that may be used for transmitting the quantization index $q_k$. The condition illustrates that (due to the usage of combined or conditional probabilities) the number of bits for a particular transform coefficient level $q_k$ typically depends on the chosen values for preceding transform coefficient levels $q_{k-1}$, $q_{k-2}$, etc. in coding order. The factors $\alpha_k$ in the equation above can be used for weighting the contribution of the individual transform coefficients, e.g., for modelling the contrast sensitivity of human vision. In the following, we generally assume that all weightings factor $\alpha_k$ are equal to 1 (but the algorithm can be straightforwardly modified in a way that different weighting factors can be taken into account).

For the transform coefficient coding in H.265|MPEG-H HEVC, an accurate computation of the rate terms is very complicated, since most binary decisions are coded using adaptive probability models. But if we neglect some aspects of the probability model selection and ignore that the probability models are adapted inside a transform block, it is possible to design an RDOQ algorithm with reasonable complexity. The RDOQ algorithm implemented in the reference software for H.265|MPEG-H HEVC consists of the following basic processing steps:

1. For each scanning position k, a transform coefficient level $q_k$ is selected by minimizing the Lagrangian cost $D_k(q_k)+\lambda \cdot R_k(q_k)$ under the assumption that the level is not inferred to be equal to zero. $D_k(q_k)$ denotes the (weighted) squared error $D_k(q_k)=\alpha_k \cdot (t_k-\Delta_k \cdot q_k)^2$ and $R_k(q_k)$ represents an estimate of the number of bits that may be used for transmitting $q_k$.
2. The flags coded_sub_block_flag for the 4×4 subblocks are determined by comparing the Lagrangian costs for the following two cases: (a) The transform coefficient levels selected in step 1 are used; (b) The syntax element coded_sub_block_flag is set equal to zero and, thus, all transform coefficient levels of the 4×4 subblock are set equal to zero.
3. The location of the first non-zero transform coefficient levels is determined by comparing the Lagrangian costs that are obtained by choosing one of the non-zero transform coefficient levels (after step 2) as first non-zero transform coefficient levels in coding order (the preceding transform coefficient levels are set equal to zero).
4. The coded_block_flag is determined by comparing the Lagrangian costs for the sequence of transform coefficient levels obtained after step 3 and the case that all transform coefficient levels inside the transform block are set equal to zero.

In [3], a modified concept for transform coding is proposed, which is described in the following in more detail. The main change relative to conventional transform coding is that the transform coefficients are not independently quantized and reconstructed. Instead, the admissible reconstruction levels for a transform coefficient depend on the selected quantization indexes for the preceding transform coefficients in reconstruction order. The concept of dependent scalar quantization is combined with a modified entropy coding, in which the probability model selection (or, alternatively, the codeword table selection) for a transform coefficient depends on the set of admissible reconstruction levels.

The advantage of the dependent quantization of transform coefficients is that the admissible reconstruction vectors are denser packed in the N-dimensional signal space (where N denotes the number of samples or transform coefficients in a transform block). The reconstruction vectors for a transform block refer to the ordered reconstructed transform coefficients (or, alternatively, the ordered reconstructed samples) of a transform block. This effect is illustrated in FIGS. 5a and b for the simplest case of two transform coefficients. FIG. 5a shows the admissible reconstruction vectors (which represent points in the 2d plane) for independent scalar quantization. As it can be seen, the set of admissible values for the second transform coefficient $t'_1$ does not depend on the chosen value for the first reconstructed transform coefficient $t'_0$. FIG. 5b shows an example for dependent scalar quantization. Note that, in contrast to independent scalar quantization, the selectable reconstruction values for the second transform coefficient $t'_1$ depend on the chosen reconstruction level for the first transform coefficient $t'_0$. In the example of FIG. 5b, there are two different sets of available reconstruction levels for the second transform coefficient $t'_1$ (illustrated by different colors). If the quantization index for the first transform coefficient $t'_0$ is even ($\ldots, -2, 0, 2, \ldots$), any reconstruction level of the first set (blue points) can be selected for the second transform coefficient $t'_1$. And if the quantization index for the first transform coefficient $t'_0$ is odd ($\ldots, -3, -1, 1, 3, \ldots$), any reconstruction level of the second set (red points) can be selected for the second transform coefficient $t'_1$. In the example, the reconstruction levels for the first and second set are shifted by half the quantization step size (any reconstruction level of the second set is located between two reconstruction levels of the first set).

The dependent scalar quantization of transform coefficients has the effect that, for a given average number of reconstruction vectors per N-dimensional unit volume, the expectation value of the distance between a given input vector of transform coefficients and the nearest available reconstruction vector is reduced. As a consequence, the average distortion between the input vector of transform coefficients and the vector reconstructed transform coefficients can be reduced for a given average number of bits. In vector quantization, this effect is referred to as space-filling gain. Using dependent scalar quantization for transform blocks, a major part of the potential space-filling gain for high-dimensional vector quantization can be exploited. And, in contrast to vector quantization, the implementation complexity of the reconstruction process (or decoding process) is comparable to that of conventional transform coding with independent scalar quantizers.

A block diagram of a transform decoder with dependent scalar quantization is illustrated in FIG. 6. The main change pertains to the dependent quantization leading to the arrows pointing from top to bottom. As indicated by these vertical arrows, the reconstructed transform coefficient $t'_k$, with reconstruction order index k>0, does not only depend on the associated quantization index $q_k$, but also on the quantization indexes $g_0, g_1, \ldots, g_{k-1}$ for preceding transform coefficients in reconstruction order. Note that in dependent quantization, the reconstruction order of transform coefficients has to be uniquely defined. The performance of the overall transform codec can be improved if the knowledge about the set of reconstruction levels associated with a quantization index $q_k$ is also exploited in the entropy coding. That means, it is advantageous to switch contexts (probability models) or codeword tables based on the set of reconstruction levels that applies to a transform coefficient.

As in conventional transform coding, transform encoding in accordance with embodiments outlined herein involve, besides an analysis transform, a quantization algorithm and entropy coding. As analysis transform typically the inverse of the synthesis transform (or a close approximation of the inverse) is used, and the entropy coding is usually uniquely specified given the entropy decoding process. But, similar as in conventional transform coding, there is a lot of freedom for selecting the quantization indexes given the original transform coefficients.

Dependent quantization of transform coefficients refers to a concept in which the set of available reconstruction levels for a transform coefficient depends on the chosen quantization indexes for preceding transform coefficients in reconstruction order (inside the same transform block). The set of admissible reconstruction levels for a current transform coefficient is selected (based on the quantization indexes for preceding transform coefficients in coding order) among two pre-defined sets of reconstruction levels.

Similarly as for conventional independent scalar quantization, a block-based quantization parameter (QP) determines a quantization step size $\Delta$ (or corresponding scale and shift parameters as described above) and all reconstruction levels (in all sets of reconstruction levels) represent integer multiples of the quantization step size $\Delta$. But each set of reconstruction levels includes only a subset of the integer multiples of the quantization step size $\Delta$. Such a configuration for dependent quantization, in which all possible reconstruction levels for all sets of reconstruction levels represent integer multiples of the quantization step size, can be considered of an extension of uniform reconstruction quantizers (URQs). Its basic advantage is that the reconstructed transform coefficients can be calculated by algorithms with a very low computational complexity.

The quantization step size $\Delta_k$ for a particular transform coefficient $t_k$ (with k indicating the reconstruction order) may not be solely determined by the block quantization parameter QP, but it is also possible that the quantization step size $\Delta_k$ for a particular transform coefficient $t_k$ is determined by a quantization weighting matrix and the block quantization parameter. Typically, the quantization step size $\Delta_k$ for a transform coefficient $t_k$ is given by the product of the weighting factor $w_k$ for the transform coefficient $t_k$ (specified by the quantization weighting matrix) and the block quantization step size $\Delta_{block}$ (specified by the block quantization parameter), $$\Delta_k = w_k \cdot \Delta_{block}.$$

It should be noted that the actual calculation of reconstructed transform coefficients $t_k'$ (or the actual calculation of reconstruction levels) may slightly deviate from an ideal multiplication due to integer implementations or other implementation aspects. Let $\Delta_k$ be the quantization step size for a particular transform coefficient $t_k$ and let $n_k$ specify a nominal integer factor of the quantization step size (e.g., given by the quantization index $q_k$). With ideal multiplication, the reconstructed transform coefficient $t'_k$ is given by $$t_k' = n_k \cdot \Delta_k.$$

Due to a restriction to integer implementations, the reconstructed transform coefficient $t'_k$ (or a corresponding reconstruction level) may be actually determined according to $$t_k' = (n_k \cdot \text{scale} + (1 << (\text{shift}-1))) >> \text{shift},$$
with $\text{scale} \cdot 2^{-\text{shift}} \approx \Delta_k.$ or a similar procedure. If we speak of integer multiples of a quantization step size in the following description, the corresponding text also applies to integer approximations similar to the one specified above.

The dependent scalar quantization for transform coefficients proposed in [3] uses two different sets of reconstruction levels and all reconstruction levels of the two sets for a transform coefficient $t_k$ represent integer multiples of the quantization step size $\Delta_k$ for this transform coefficient (which is, at least partly, determined by a block-based quantization parameter). Note that the quantization step size $\Delta_k$ just represents a scaling factor for the admissible reconstruction values in both sets. Except of a possible individual quantization step size $\Delta_k$ for the different transform coefficients $t_k$ inside a transform block (and, thus, an individual scaling factor), the same two sets of reconstruction levels are used for all transform coefficients.

Figures 7, 8, 9:
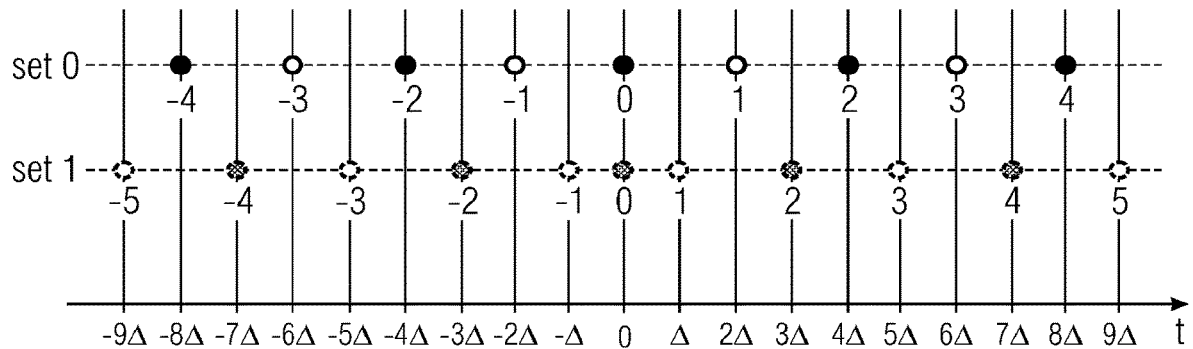
FIG. 7 a schematic diagram illustrating for an embodiment of dependent quantization two sets of reconstruction levels that are completely determined by a single quantization steps size Δ. The two available sets of reconstruction levels are highlighted denoted set 0 (top line) and set 1 (bottom line). Examples for quantization indexes that indicate a reconstruction level inside a set are given by the numbers below the circles. The hollow and filled circles indicate two different subsets inside the sets of reconstruction levels; the subsets can be used for determining the set of reconstruction levels for the next transform coefficient in reconstruction order. Both sets include the reconstruction level equal to zero, but are otherwise disjoint; both sets are symmetric around zero.
FIG. 8 shows a pseudo-code illustrating an example for the reconstruction process for transform coefficients. k represents an index that specifies the reconstruction order of the current transform coefficient, the quantization index for the current transform coefficient is denoted by level[k], the quantization step size $\Delta_k$ that applies to the current transform coefficient is denoted by quant_step_size[k], and trec[k] represents the value of the reconstructed transform coefficient $t'_k$. The variable setId[k] specifies the set of reconstruction levels that applies to the current transform coefficient. It is determined based on the preceding transform coefficients in reconstruction order; the possible values of setId[k] are 0 and 1. The variable n specifies the integer factor of the quantization step size; it is given by the chosen set of reconstruction levels (i.e., the value of setId[k]) and the transmitted quantization index level[k].
FIG. 9 shows a pseudo-code illustrating an alternative implementation of the pseudo-code in FIG. 8. The main change is that the multiplication with the quantization step is represented using an integer implementation using a scale and a shift parameter. Typically, the shift parameter (represented by shift) is constant for a transform block and only the scale parameter (given by scale[k]) may depend on the location of the transform coefficient. The variable add represents a rounding offset, it is typically set equal to add= (1<<(shift−1)). With $\Delta_k$ being the nominal quantization step for the transform coefficient, the parameters shift and scale [k] are chosen in a way that we have $\Delta_k \approx \text{scale}[k] \cdot 2^{-\text{shift}}$.

In FIG. 7, the advantageous configuration for the two sets of reconstruction levels t is illustrated. The reconstruction levels that are contained in the first quantization set (labeled as set 0 in the figure) represent the even integer multiples of the quantization step size. The second quantization set (labeled as set 1 in the figure) contains all odd integer multiples of the quantization step size and additionally the reconstruction level equal to zero. Note that both reconstruction sets are symmetric about zero. The reconstruction level equal to zero is contained in both reconstruction sets, otherwise the reconstruction sets are disjoint. The union of both reconstruction sets contains all integer multiples of the quantization step size.

The reconstruction level that the encoder selects among the admissible reconstruction levels are transmitted inside the bitstream. As in conventional independent scalar quantization, this can be achieved using so-called quantization indexes, which are also referred to as transform coefficient levels. Quantization indexes (or transform coefficient levels) are integer numbers that uniquely identify the available reconstruction levels inside a quantization set (i.e., inside a set of reconstruction levels). The quantization indexes are sent to the decoder as part of the bitstream (using any entropy coding technique). At the decoder side, the reconstructed transform coefficients can be uniquely calculated based on a current set of reconstruction levels (which is determined by the preceding quantization indexes in coding/reconstruction order) and the transmitted quantization index for the current transform coefficient.

The assignment of quantization indexes to reconstruction levels inside a set of reconstruction levels (or quantization set) may follow the following rule as may be seen in FIG. 7: The quantization index equal to 0 is assigned to the reconstruction level equal to 0. The quantization index equal to 1 is assigned to the smallest reconstruction level greater than 0, the quantization index equal to 2 is assigned to the next reconstruction level greater than 0 (i.e., the second smallest reconstruction level greater than 0), etc. Or, in other words, the reconstruction levels greater than 0 are labeled with integer numbers greater than 0 (i.e., with 1, 2, 3, etc.) in increasing order of their values. Similarly, the quantization index −1 is assigned to the largest reconstruction level smaller than 0, the quantization index −2 is assigned to the next (i.e., the second largest) reconstruction level smaller than 0, etc. Or, in other words, the reconstruction levels smaller than 0 are labeled with integer numbers less than 0 (i.e., −1, −2, −3, etc.) in decreasing order of their values. The reconstruction process for a transform coefficient could be implemented similar to the algorithm specified in the pseudo-code of FIG. 8.

In the pseudo-code of FIG. 8, level[k] denotes the quantization index that is transmitted for a transform coefficient $t_k$ and setId[k] (being equal to 0 or 1) specifies the identifier of the current set of reconstruction levels (it is determined based on preceding quantization indexes in reconstruction order as will be described in more detail below). The variable n represents the integer multiple of the quantization step size given by the quantization index level[k] and the set identifier setId[k]. If the transform coefficient is coded using the first set of reconstruction levels (setId[k]==0), which contains the even integer multiples of the quantization step size $\Delta_k$, the variable n is two times the transmitted quantization index. If the transform coefficient is coded using the second set of reconstruction levels (setId[k]==1), we have the following three cases: (a) if level[k] is equal to 0, n is also equal to 0; (b) if level[k] is greater than 0, n is equal to two times the quantization index level[k] minus 1; and (c) if level[k] is less than 0, n is equal to two times the quantization index level[k] plus 1. This can be specified using the sign function $$\text{sign}(x) = \begin{cases} 1: & x > 0 \\ 0: & x = 0 \\ -1: & x < 0 \end{cases}.$$

Then, if the second quantization set is used, the variable n is equal to two times the quantization index level[k] minus the sign function sign(level[k]) of the quantization index.

Once the variable n (specifying the integer factor of the quantization step size) is determined, the reconstructed transform coefficient $t_k'$ is obtained by multiplying n with the quantization step size $\Delta_k$.

As mentioned above, instead of an exact multiplication with the quantization step size $\Delta_k$, the reconstructed transform coefficient $t_k'$ can be obtained by an integer approximation. This is illustrated in the pseudo-code in FIG. 9. Here, the variable shift represents a bit shift to the right. Its value typically depends only on the quantization parameter for the block (but it is also possible that the shift parameter can be changed for different transform coefficients inside a block). The variable scale[k] represents a scaling factor for the transform coefficient $t_k$; in addition to the block quantization parameter, it can, for example, depend on the corresponding entry of the quantization weighting matrix. The variable "add" specifies a rounding offset, it is typically set equal to add=(1<<(shift−1)). It should be noted that the integer arithmetic specified in the pseudo-code of FIG. 9 (last line) is, with exception of the rounding, equivalent to a multiplication with a quantization step size $\Delta_k$, given by $$\Delta_k = \text{scale}[k] \cdot 2^{-\text{shift}}.$$

Another (purely cosmetic) change in FIG. 9 relative to FIG. 8 is that the switch between the two sets of reconstruction levels is implemented using the ternary if-then-else operator (a?b:c), which is known from programming languages such as the C programming language.

Besides the selection of the sets of reconstruction levels discussed above, another task in dependent scalar quantization in transform coding is the algorithm used for switching between the defined quantization sets (sets of reconstruction levels). The used algorithm determines the "packing density" that can be achieved in the N-dimensional space of transform coefficients (and, thus, also in the N-dimensional space of reconstructed samples). A higher packing density eventually results in an increased coding efficiency.

Figures 10, 11:
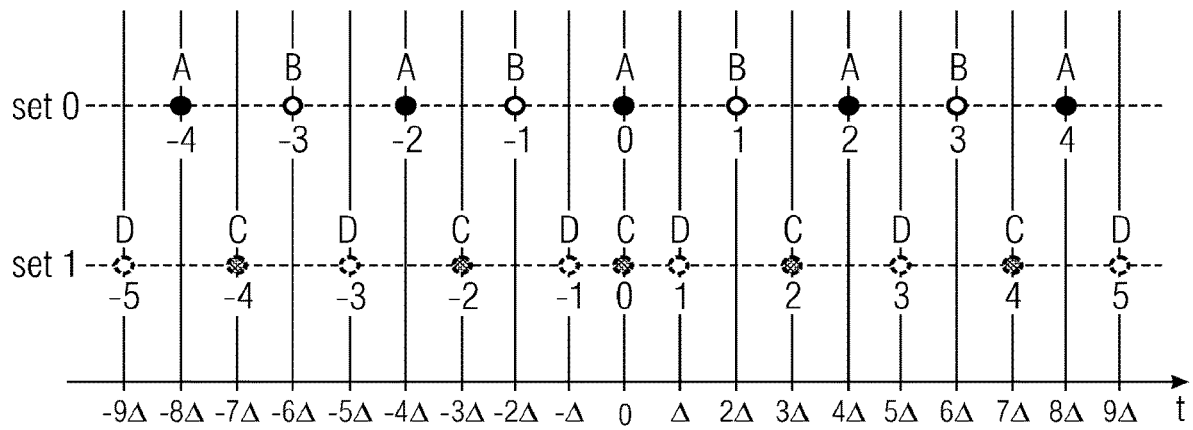
FIG. 10 shows a schematic diagram of an example for a splitting of the sets of reconstruction levels into two subsets. The two shown quantization sets are the quantization sets of the example of FIG. 7. The two subsets of the quantization set 0 are labeled using "A" and "B", and the two subsets of quantization set 1 are labeled using "C" and "D".
FIG. 11 shows a pseudo-code illustrating an example for the reconstruction process of transform coefficients for a transform block. The array level represents the transmitted transform coefficient levels (quantization indexes) for the transform block and the array trec represent the corresponding reconstructed transform coefficients. The 2d table state_trans_table specifies the state transition table and the table setId specifies the quantization set that is associated with the states.

In the concept presented in [3], the set of reconstruction levels for the next transform coefficients is determined based on a partitioning of the quantization sets, as it is illustrated in FIG. 10. Each of the two quantization sets is partitioned into two subsets. The first quantization set (labeled as set 0) is partitioned into two subsets (which are labeled as A and B) and the second quantization set (labeled as set 1) is also partitioned into two subsets (which are labeled as C and D). In FIG. 7 and FIG. 10, the partitioning of the quantization sets into subsets is indicated by hollow and filled circles. The following partitioning rules apply:

Subset A consists of all even quantization indexes of the quantization set 0;
Subset B consists of all odd quantization indexes of the quantization set 0;
Subset C consists of all even quantization indexes of the quantization set 1;
Subset D consists of all odd quantization indexes of the quantization set 1.

The used subset is not explicitly indicated inside the bitstream. Instead, it can be derived based on the used quantization set (e.g., set 0 or set 1) and the actually transmitted quantization index. The subset can be derived by a bit-wise "and" operation of the transmitted quantization index level and 1. Subset A consists of all quantization indexes of set 0 for which (level&1) is equal to 0, subset B consists of all quantization indexes of set 0 for which (level&1) is equal to 1, subset C consists of all quantization indexes of set 1 for which (level&1) is equal to 0, and subset D consists of all quantization indexes of set 1 for which (level&1) is equal to 1.

The transition between the quantization sets (set 0 and set 1) is represented by a state variable; which has four possible values (0, 1, 2, 3). On the one hand, the state variable specifies the quantization set that is used for the current transform coefficient. The quantization set 0 is used if and only if the state variable is equal to 0 or 1, and the quantization set 1 is used if and only if the state variable is equal to 2 or 3. On the other hand, the state variable also specifies the possible transitions between the quantization sets. Table 1 shows the state transition table used. Given a current state, it specifies the quantization set for the current transform coefficient (second column). It further specifies the state transition based on the path that is associated with the chosen quantization index (the path specifies the used subset A, B, C, or D if the quantization set is given). In reconstructing the transform coefficients for a block, it is sufficient to update a state variable and determine the path of the used quantization index.

TABLE 1

Advantageous example of a state transition table for a configuration with 4 states.

| current state | quantization set for current coefficient | next state path 0 | next state path 1 |
|---|---|---|---|
| 0 | 0 | 0 | 2 |
| 1 | 0 | 2 | 0 |
| 2 | 1 | 1 | 3 |
| 3 | 1 | 3 | 1 |

The path is given by the parity of the quantization index. With level[k] being the current quantization index, it can be determined according to path=(level[$k$]&1), where the operator & represents a bit-wise "and" in two-complement integer arithmetic.

Using the concept of state transition, the current state and, thus, the current quantization set is uniquely determined by the previous state (in reconstruction order) and the previous quantization index, such as its parity in the present example. The first state for a transform block is set equal to 0.

The concept of state transition for the dependent scalar quantization allows low-complexity implementations for the reconstruction of transform coefficients in a decoder. An advantageous example for the reconstruction process of transform coefficients of a single transform block is shown in FIG. 11 using C-style pseudo-code.

In the pseudo-code of FIG. 11, the index k specifies the reconstruction order of transform coefficients. It should be noted that, in the example code, the index k decreases in reconstruction order. The last transform coefficient has the index equal to k=0. The first index $k_{start}$ specifies the reconstruction index (or, more accurately, the inverse reconstruction index) of the first reconstructed transform coefficient. The variable $k_{start}$ may be set equal to the number of transform coefficients in the transform block minus 1, or it may be set equal to the index of the first non-zero quantization index (for example, if the location of the first non-zero quantization index is transmitted in the applied entropy coding method) in coding/reconstruction order. In the latter case, all preceding transform coefficients (with indexes k >$k_{start}$) are inferred to be equal to 0. The reconstruction process for each single transform coefficient is the same as in the example of FIG. 9. As for the example in FIG. 9, the quantization indexes are represent by level [k] and the associated reconstructed transform are represented by trec [k]. The state variable is represented by state. Note that in the example of FIG. 11, the state is set equal to 0 at the beginning of a transform block. The 1$d$ table setId[ ] specifies the quantization sets that are associated with the different values of the state variable and the 2$d$ table state_trans_table[ ][ ] specifies the state transition given the current state (first argument) and the path (second argument). The path is given by the parity of the quantization index (using the bit-wise and operator &).

Instead of the table setId[ ], a simple arithmetic operation can be used; for example, a bit-shift to the right:

setId[state]=state>>1

Similarly, the table state_trans_table[ ][ ] can also be implemented using simple arithmetic operations. For example, state_trans_table[state][path]=(32040>>((state<<2)+
   (path<<1)))&3

At this, the complete state transition table is given by the 16-bit value "32040". Note that by replacing the value "32040" with "0", we can easily switch between dependent and independent quantization. The value "0" represents a state transition table that chooses the state 0 and thus the conventional uniform reconstruction quantizer Q0.

Figure 12:
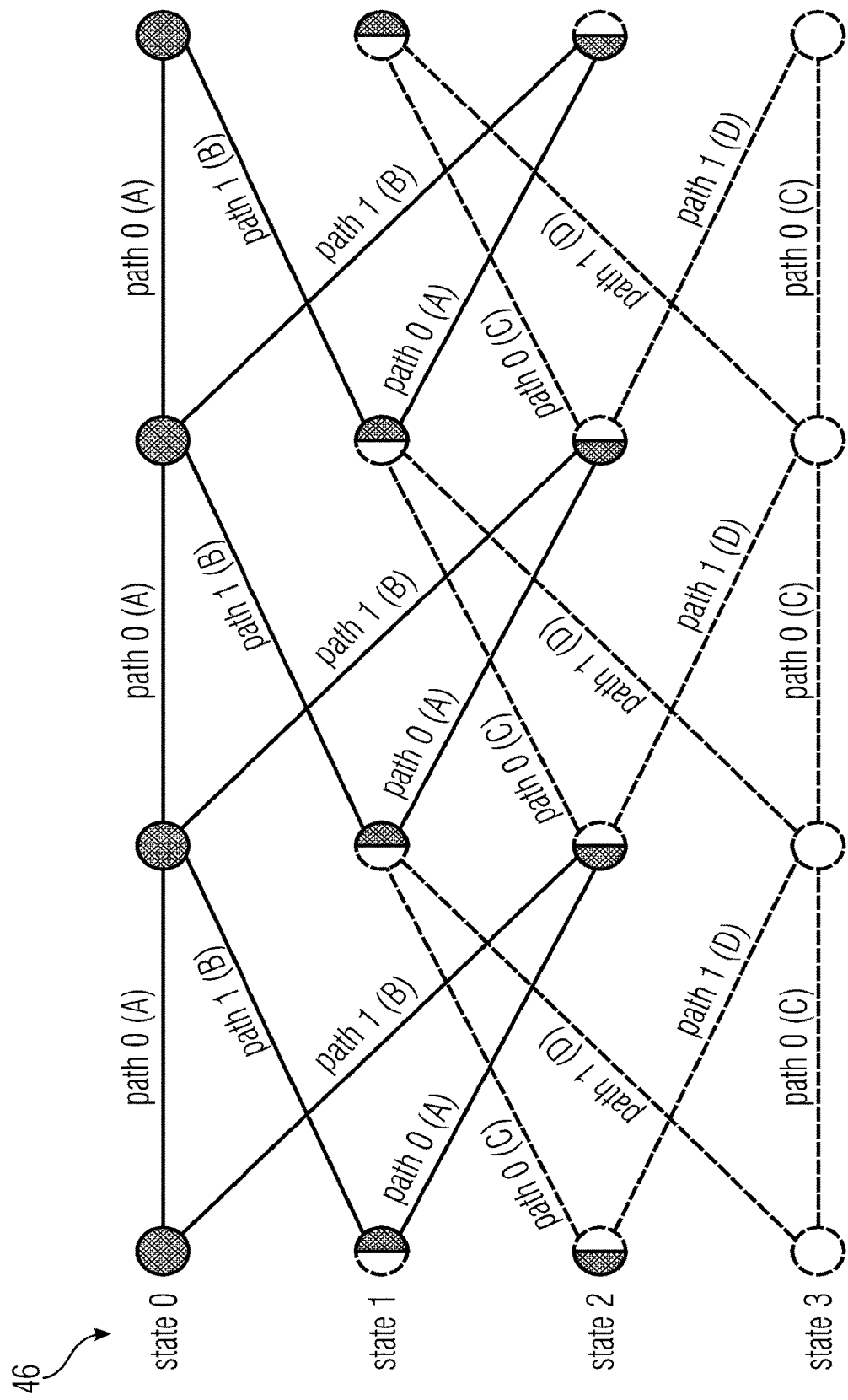
FIG. 12 shows a schematic diagram illustrating a state transition in dependent scalar quantization as trellis structure. The horizontal exists represents different transform coefficients in reconstruction order. The vertical axis represents the different possible states in the dependent quantization and reconstruction process. The shown connections specify the available paths between the states for different transform coefficients.

The state transition in dependent quantization can also be represented using a trellis structure, as is illustrated in FIG. 12. The trellis shown in this figure corresponds to the state transitions specified in Table 1. For each state, there are two paths that connect the state for a current transform coefficient with two possible states for the next transform coefficient in reconstruction order. The paths are labeled with path 0 and path 1, this number corresponds to the path variable that was introduced above (for an advantageous embodiment, that path variable is equal to the parity of the quantization index). Note that each path uniquely specifies a subset (A, B, C, or D) for the quantization indexes. In FIG. 12, the subsets are specified in parentheses. Given an initial state (the state 0), the path through the trellis is uniquely specified by the transmitted quantization indexes.

For the example in FIG. 12, the states (0, 1, 2, and 3) have the following properties:

State 0: The previous quantization index level[k−1] specifies a reconstruction level of set 0 and the current quantitation index level[k] specifies a reconstruction level of set 0.

State 1: The previous quantization index level[k−1] specifies a reconstruction level of set 1 and the current quantitation index level[k] specifies a reconstruction level of set 0.

State 2: The previous quantization index level[k−1] specifies a reconstruction level of set 0 and the current quantitation index level[k] specifies a reconstruction level of set 1.

State 0: The previous quantization index level[k−1] specifies a reconstruction level of set 1 and the current quantitation index level[k] specifies a reconstruction level of set 1.

Figure 13:
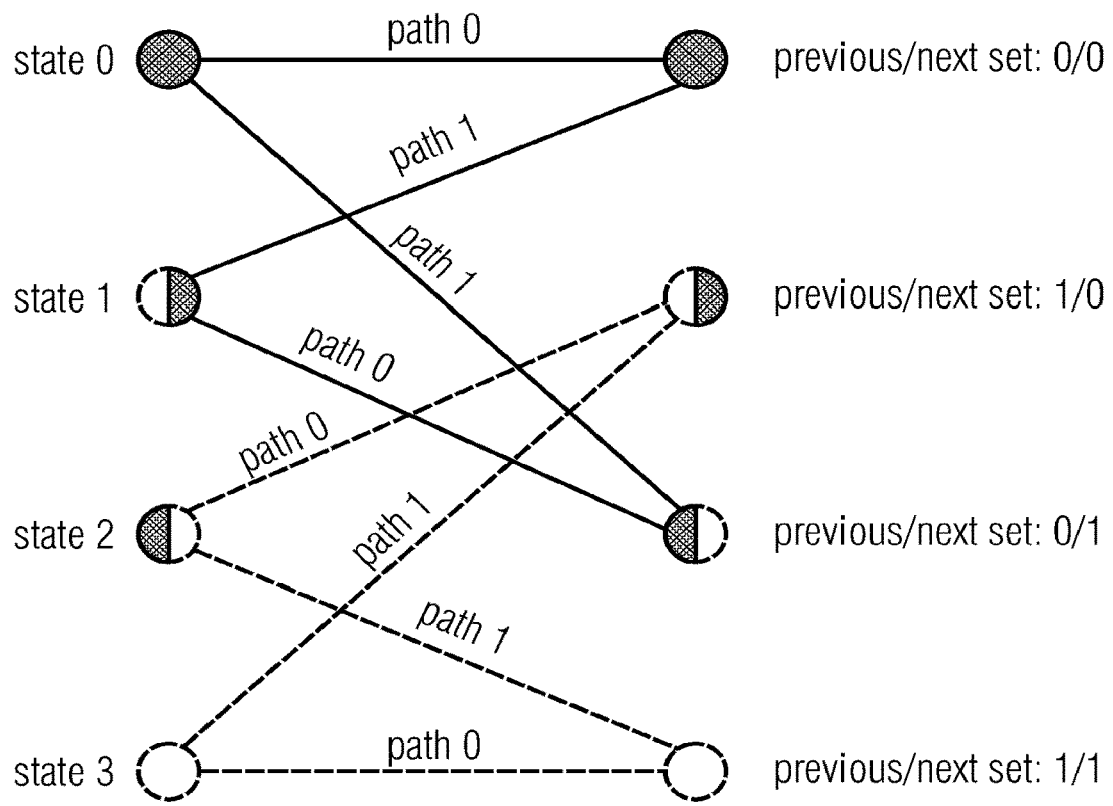
FIG. 13 shows an example of a basic trellis cell.

The trellis consists of a concatenation of so-called basic trellis cells. The basic trellis cell is shown in FIG. 13.

An aspect of dependent scalar quantization as outlined above is that there are different sets of admissible reconstruction levels (also called quantization sets) for the transform coefficients. The quantization set for a current transform coefficient is determined based on the values of the quantization index for preceding transform coefficients. If we compare the two quantization sets, it is obvious that the distance between the reconstruction level equal to zero and the neighboring reconstruction levels is larger in set 0 than in set 1. Hence, the probability that a quantization index is equal to 0 is larger if set 0 is used and it is smaller if set 1 is used. For an efficient coding, this aspect is exploited in the entropy coding by switching probability models based on the quantization sets (or states) that are used for a current quantization index.

Note that for a suitable switching of probability models, the path (association with a subset of the used quantization set) of all preceding quantization indexes should be known when entropy decoding a current quantization index (or a corresponding binary decision of a current quantization index). For that purpose, in the codec proposed in [3], the transform coefficients are coded in reconstruction order. The quantization indexes are coded using binary arithmetic coding similar to H.264|MPEG-4 AVC or H.265|MPEG-H HEVC. The non-binary quantization indexes are first mapped onto a series of binary decisions (which are commonly referred to as bins). The quantization indexes are transmitted as absolute value and, for absolute values greater than 0, a sign.

Figure 14:
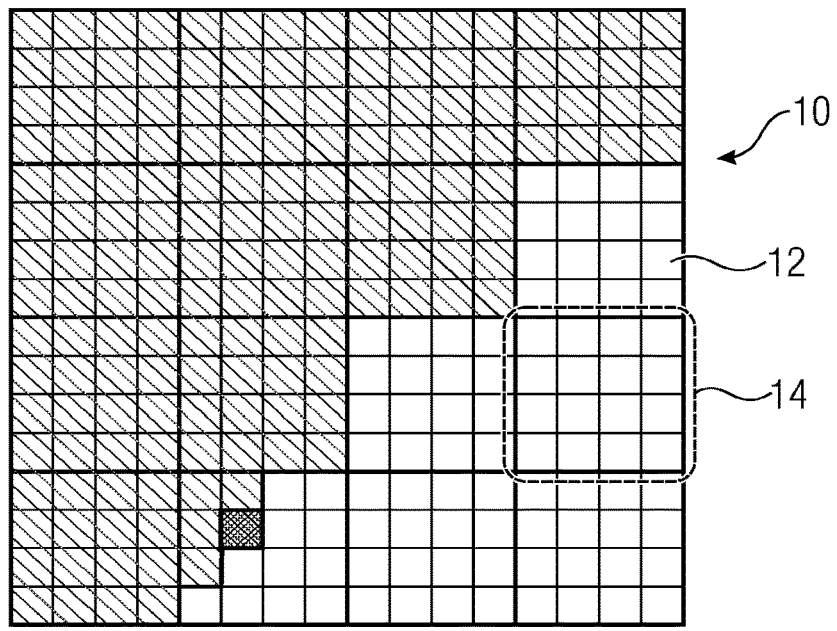
FIG. 14 shows a schematic diagram of a transform block for illustration of signaling of the position of the first non-zero quantization index in coding order which his position is illustrated by back filling. In addition to the position of the first non-zero transform coefficients, only bins for the shaded coefficients are transmitted, the white-marked coefficients are inferred to be equal to 0.

Similarly as for HEVC, the transform coefficient levels of a transform block are coded on the basis of subblocks. First, a flag coded_block_flag is transmitted, which specifies whether or not the transform block contains any non-zero transform coefficient levels. If coded_block_flag is equal to 0 (i.e., the block does not contain any non-zero levels), no further information is transmitted for the transform block. Otherwise (coded_block_flag is equal to 1), the following applies:

- The x and y coordinate of the first non-zero level in coding order. As illustrated in FIG. 14, the transmitted location of the first non-zero level specifies that all transform coefficients that precede the identified coefficient in coding order (marked white in FIG. 14) are inferred to be equal to zero. Further data are only transmitted for the coefficient at the specified location (marked black in FIG. 14) and the coefficients that follow this coefficient in coding order (marked shaded in FIG. 14). The example in FIG. 14 shows a 16×16 transform block with 4×4 subblocks; the used coding order is the subblock-wise diagonal scan specified in H.265|MPEG-H HEVC.
- For the subblocks that precede that subblock containing the first non-zero level (indicated by the transmitted x and y coordinate), a flag coded_subblock_flag is transmitted, which specifies whether or not the subblock contains any non-zero transform coefficient levels. As an exception, the coded_subblock_flag is not transmitted for the subblock that contains the DC coefficient. For this subblock, the coded_subblock_flag is inferred to be equal to 1.
- Finally, for all subblocks with coded_subblock_flag equal to 1 as well as for the subblock that contains the first non-zero level in coding order, the values of the transform coefficient levels are coded as illustrated by the pseudo-code in FIG. 15. At this, firstScanIdSbb represents the first scan index inside a subblock. For the subblock that contains the first non-zero level (indicated by the transmitted x and y coordinate), firstScanIdSbb is equal to the scan index firstNonZero that corresponds to the transmitted (x,y) coordinate. For the other transmitted subblocks, firstScanIdSbb specifies the first scan index inside the subblock. The scan index lastScanIdSbb specifies the last scan index inside the subblock. Note that all coefficients inside a subblock are coded before any coefficient of the next subblock in coding order is coded.

The levels of a subblock are coded in two passes. In the first pass, the absolute values are transmitted and in the second pass, the signs are transmitted for all coefficients with absolute values not equal to zero. The absolute values are coded as follows:

- A flag sig_flag is transmitted, which specifies whether or not the absolute level is greater than zero. This flag is not transmitted if it can be inferred to be equal to 1, i.e., when any of the following conditions applies:
  - the current scan index k is equal to the scan index of the first non-zero level (as indicated by the transmitted x and y coordinates);
  - the current scan index is the last scan index inside a subblock, a coded_subblock_flag equal to 1 has been transmitted for the subblock, and all previous levels in the subblock are equal to 0.
- If sig_flag is equal to 1 (i.e., the absolute level is greater than 0), another flag gt1_flag is transmitted, which specifies whether or not the absolute level is greater than one.
- If sig_flag and gt1_flag are equal to 1 (i.e., the absolute level is greater than 1), another flag gt2_flag is transmitted, which specifies whether or not the absolute level is greater than two.
- If sig_flag, gt1_flag and gt2_flag are equal to 1 (i.e., the absolute level is greater than 2), another flag gt3_flag is transmitted, which specifies whether or not the absolute level is greater than three.
- If sig_flag, gt1_flag, gt2_flag and gt3_flag are equal to 1 (i.e., the absolute level is greater than 3), another flag gt4_flag is transmitted, which specifies whether or not the absolute level is greater than four.
- If sig_flag, gt1_flag, gt2_flag, gt3_flag and gt4_flag are equal to 1 (i.e., the absolute level is greater than 4), the syntax element gt3_flag is transmitted which specifies the absolute value minus 5.

After the absolute values for all levels of a subblock are transmitted, the sign bits sign_flag are transmitted for all coefficients with absolute levels not equal to zero.

The flags sig_flag, gt1_flag, gt2_flag, gt3_flag and gt4_flag coded using adaptive probability models (also referred to as contexts). For these flags, one of multiple adaptive probability models are selected as follows:

Let state be the current value of the state variable for a transform coefficient (the state variable is determined based on the parity of already coded levels in coding order). Let diag specify the diagonal position of a current scan position (diag=x+y, where x and y specify the x and y coordinate of the scan position). Furthermore, let sumAbsTemplate be the sum of already coded absolute values in a local neighborhood illustrated in FIG. 16, with the corresponding neighborhood being indicated by way of shading those coefficients belonging to the neighborhood of the coefficient whose bin is currently coded which is drawn black, in turn. And let numSigTemplate be the number of absolute levels greater than 0 in the same local neighborhood.

For the sig_flag, the selected probability model depends on:

- The diagonal (given by the sum of the x and y coordinate) of the current scan position;
- The quantizer (Q0 or Q1, given by state>>1) that is used for the current transform coefficients;
- The sum of already coded absolute levels in a local neighbourhood given by sumAbsTemplate.

For the gt1_flag, the selected probability model depends on:

- The diagonal (given by the sum of the x and y coordinate) of the current scan position;
- The quantizer (Q0 or Q1, given by state>>1) that is used for the current transform coefficients;
- The value sumAbsTemplate−numSigTemplate (i.e., the sum of absolute values in the local neighborhood minus the number of absolute levels greater than 0 in the local neighborhood).

For the gt2_flag, gt3_flag, and gt4_flag, the same probability model is used. It is selected depending on:

- The diagonal (given by the sum of the x and y coordinate) of the current scan position;
- The value sumAbsTemplate−numSigTemplate (i.e., the sum of absolute values in the local neighborhood minus the number of absolute levels greater than 0 in the local neighborhood).

The non-binary syntax element first binarized (i.e., mapped to a sequence of bins) and the bins are coded in the bypass mode of the arithmetic coding engine (using a non-adaptive probability model with a pmf {0.5,0.5}). For the binarization, Rice-Golomb codes are used, which are parameterized by a so-called Rice parameter. The Rice parameter is selected depending on the value of (sumAbsTemplate−numSigTemplate). Finally, the sign flags are coded using the bypass mode of the arithmetic coding engine.

For obtaining bitstreams that provide a very good trade-off between distortion (reconstruction quality) and bit rate, the quantization indexes should be selected in a way that a Lagrangian cost measure $$D + \lambda \cdot R = \sum_k D_k + \lambda \cdot R_k = \sum_k \alpha_k \cdot (t_k - t'_k)^2 + \lambda \cdot R(q_k \mid q_{k-1}, q_{k-2}, \ldots)$$

is minimized. For independent scalar quantization, such a quantization algorithm (referred to as rate-distortion optimized quantization or RDOQ) was discussed before. But in comparison to independent scalar quantization, we have an additional difficulty. The reconstructed transform coefficients $t'_k$ and, thus, their distortion $D_k=(t_k-t'_k)^2$, do not only depend on the associated quantization index $q_k$, but also on the values of the preceding quantization indexes in coding order.

Figure 17:
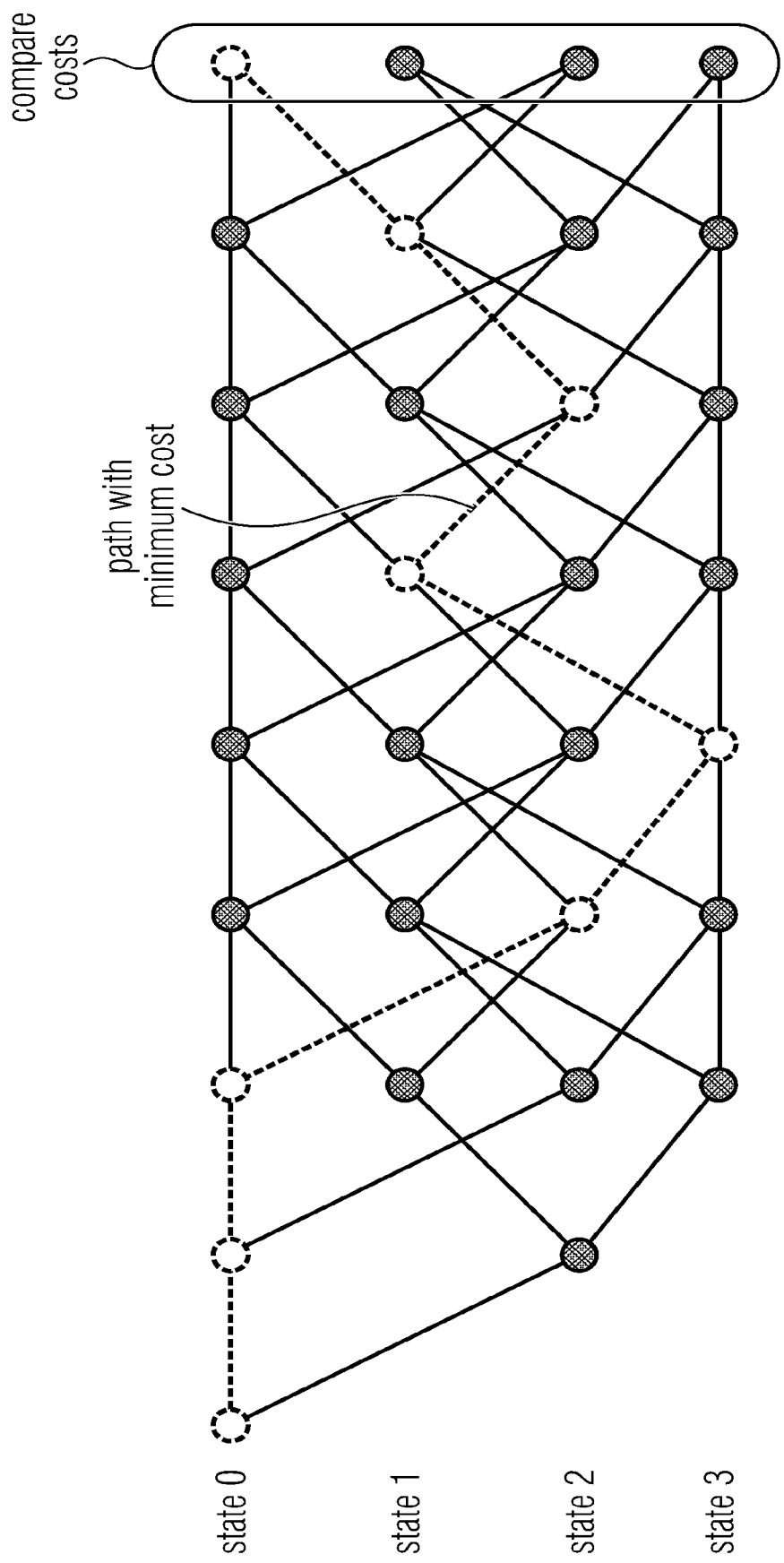
FIG. 17 shows a schematic diagram of an example trellis structure that can be exploited for determining sequences (or blocks) of quantization indexes that minimize a cost measures (such as an Lagrangian cost measure D+λ·R). The trellis is shown for 8 transform coefficients (or quantization indexes). The first state (at the very left) represents an initial state, which is set equal to 0.

However, as we have discussed above, the dependencies between the transform coefficients can be represented using a trellis structure. For the further description, we use the advantageous embodiment given in FIG. 17 as an example. The trellis structure for the example of a block of 8 transform coefficients is shown in FIG. 17. The paths through the trellis (from the left to the right) represent the possible state transitions for the quantization indexes. Note that each connection between two nodes represents a quantization index of a particular subset (A, B, C, D). If we chose a quantization index qk from each of the subsets (A, B, C, D) and assign the corresponding rate-distortion cost $$J_k=D_K(q_k|q_{k-1}, q_{k-2}, \ldots )+\lambda \cdot R_k(q_kq_{k-1}, 9_{k-2}, \ldots )$$

to the associated connection between two trellis nodes, the problem of determining the vector/block of quantization indexes that minimizes the overall rate-distortion cost D+λ·R is equivalent to finding the path with minimum cost path through the trellis (from the left to the right in FIG. 17). If we neglect some dependencies in the entropy coding (similar to RDOQ), this minimization problem can be solved using the well-known Viterbi algorithm.

An example encoding algorithm for selecting suitable quantization indexes for a transform block could consist of the following main steps:
1. Set the rate-distortion cost for initial state equal to 0.
2. For all transform coefficients in coding order, do the following:
   a. For each subset A, B, C, D, determine the quantization index that minimizes the distortion for the given original transform coefficient.
   b. For all trellis nodes (0, 1, 2, 3) for the current transform coefficient, do the following:
      i. Calculate the rate-distortion costs for the two paths that connect a state for the preceding transform coefficient with the current state. The costs are given as the sum of the cost for the preceding state and the $D_k+\lambda \cdot R_k$, where $D_k$ and $R_k$ represent the distortion and rate for choosing the quantization index of the subset (A, B, C, D) that is associated with the considered connection.
      ii. Assign the minimum of the calculated costs to the current node and prune the connection to the state of the previous transform coefficient that does not represent the minimum cost path.
      Note: After this step all nodes for the current transform coefficient have a single connection to any node for the preceding transform coefficient.
3. Compare the costs of the 4 final nodes (for the last coefficient in coding order) and chose the node with minimum cost. Note that this node is associated with a unique path through the trellis (all other connection were pruned in the previous steps).
4. Follow the chosen path (specified by the final node) is reverse order and collect the quantization indexes that are associated with the connections between the trellis nodes.

Now, embodiments of the present application are described. They are presented in a self-contained manner, but sometimes reference to the above discussed figures is made. In particular, below description focusses on differences to the above examples, and thus, these differences may be used to modify above description to yield further embodiments, and vice versa, the individual tasks described above, such as the ones pertaining to context selection, quantizing, dequantizing, transforming, re-transforming, entropy coding/decoding may be used, individually or in combination, to modify, or further specify, the subsequently explained embodiments to yield even further embodiments.

The transform coding with dependent scalar quantization [3] as described above generally improves coding efficiency compared to transform coding with conventional independent scalar quantization. However, the entropy coding of the dependent quantization indexes (transform coefficient levels) described in FIG. 15 above has two problems, which make it difficult to achieve a high throughput hardware design:
   The bins that are coded in the regular coding mode of the arithmetic coding engine (sig_flag, gt1_flag, gt2_flag, gt3_flag and gt4_flag) are interleaved with the bin that are coded in bypass mode (bins of the syntax element remainder). The bypass mode of the arithmetic coding engine can be more efficiently implemented than the regular mode. And furthermore, the bypass mode of the arithmetic coding can be particularly efficiently implemented when a rather large number of bypass bins are coded successively. A frequent switching between the regular mode and the bypass mode is disadvantageous for hardware implementations.
   The probability model for most bins directly depends on the value of the directly preceding bin. For example, the probability model used for the sig_flag depends on the parity of the previous absolute levels (which is not known before the last bin for the previous level was read). Then, the value of sig_flag determines whether the next bin is a gt1_flag or another sig_flag. If a gt1_flag is read, its value determines whether the next bin is a gt2_flag or a sig_flag, etc. These direct dependencies prevent an efficient pipelining of the arithmetic decoding process. It would be advantageous to reduce the number of direct dependencies, so that the arithmetic decoding of the bins can be pipelined to a certain degree.

An approach that reduces the complexity of the state-of-the-art residual coding design is the coding in several scanning passes. In each scanning pass, partial information of the levels is transmitted so that the full level information is available only after the final scanning pass. This design is, however, not compatible with the dependent quantization technique. It should be noted that a re-ordering of the bins is not straightforward for dependent quantization due to the following reasons:

In particular for the flags sig_flag, we have significantly different probability mass functions for the two supported quantizers. If we do not know the quantizer (Q0 or Q1) for a current transform coefficient, the compression efficiency will be significantly degraded. But the quantizer used depends on the parities of all transform coefficient levels, which are only known if all bins of all previous transform coefficients are coded before the first bin (sig_flag) for a current transform coefficient.

The context modelling for the bins also depends on the knowledge about already transmitted absolute levels in a local neighborhood. Typically, a better knowledge about the neighboring transform coefficient levels improves coding efficiency.

Franky speaking, embodiments described further below overcome the mentioned issues by one or more of the following design aspects:

The bins related to the transform coefficient levels of a subblock (or block) are coded in multiple passes over all scanning positions.

The first pass—or the first passes—over the scanning positions include(s) the coding of the sig_flag and, if sig_flag is equal to 1, a parity flag par_flag (specifying the parity of the transform coefficient level). It may or may not include additional data. Note that by coding dedicated parity flags, the quantizer used for a transform coefficient is known and this knowledge can be used for an efficient context modeling of the sig_flag's.

All bypass bins of the syntax element remainder for a subblock (or block) are coded in a separate pass. That means, all bypass bins of a subblock (or block) are successively coded.

In the following, a design approach is described that is firstly compatible with a quantization method that may use the parity information and secondly inherits less complexity than the coding of full absolute level information. The central concept is the transmission of the parity information for each absolute level as a dedicated syntax element. Different locations are possible, e.g., before the significance flag, after the significance flag, after any "is level greater than" information. The semantics of the syntax elements following the parity information alternates depending on the selected location for the transmission of the parity syntax element. When the parity information is available, the remaining absolute level information can be divided by two resulting in different conditional probabilities for the syntax elements.

Further details on the coding order of bins and the associated context modeling are described in the following.

In an embodiment, the transform coefficient levels of a transform block are coded on the basis of subblocks, similarly to HEVC. First, a flag coded_block_flag is transmitted, which specifies whether or not the transform block contains any non-zero transform coefficient levels. If coded_block_flag is equal to 0 (i.e., the block does not contain any non-zero levels), no further information is transmitted for the transform block. Otherwise (coded_block_flag is equal to 1), the following applies:

The x and y coordinates of the first non-zero level in coding order are transmitted. As illustrated in FIG. 14, the transmitted location of the first non-zero level specifies that all transform coefficients that precede the identified coefficient in coding order (marked white in FIG. 14) are inferred to be equal to zero.

For the subblocks that follow that subblock containing the first non-zero level (indicated by the transmitted x and y coordinate) in coding order, a flag coded_subblock_flag is transmitted, which specifies whether or not the subblock contains any non-zero transform coefficient levels. As an exception, the coded_subblock_flag is not transmitted for the subblock that contains the DC coefficient. For this subblock, the coded_subblock_flag is inferred to be equal to 1.

Finally, for all subblocks with coded_subblock_flag equal to 1 as well as for the subblock that contains the first non-zero level in coding order, the values of the transform coefficient levels are coded as will be described in the following.

An advantageous embodiment for coding the transform coefficient levels of a subblock is illustrated by the pseudo-code in FIG. 18. At this, firstScanIdSbb represents the first scan index inside a subblock. For the subblock that contains the first non-zero level (indicated by the transmitted x and y coordinate), firstScanIdSbb is equal to the scan index firstNonZero that corresponds to the transmitted (x,y) coordinate. For the other transmitted subblocks, firstScanIdSbb specifies the first scan index inside the subblock. The scan index lastScanIdSbb specifies the last scan index inside the subblock.

Let level[k] and absLevel[k]=abs(level[k]) represent the transform coefficient level and the absolute value of the transform coefficient level at scan position k. The coding of transform coefficient levels proceeds in four passes over the scan positions inside a subblock:

In the first pass, the binary syntax elements sig_flag, par_flag, and gt1_flag are transmitted:

The binary syntax element sig_flag[k] specifies whether the absolute value of the transform coefficient level at scan position k is greater than 0, i.e., $$\text{sig\_flag}[k]=(\text{absLevel}[k]>0\,?\,1:0).$$

sig_flag is not transmitted if it can be inferred to be equal to 1, i.e., when any of the following conditions applies:
the current scan index k is equal to the scan index of the first non-zero level (as indicated by the transmitted x and y coordinates);
the current scan index is the last scan index inside a subblock, a coded_subblock_flag equal to 1 has been transmitted for the subblock, and all previous levels in the subblock are equal to 0.

If sig_flag[k] is equal to 1, the binary syntax elements par_flag[k], and gt1_flag[k] are transmitted.

par_flag[k] specifies the parity of the transform coefficient level. In an advantageous embodiment of the invention par_flag[k] is set equal to the parity of the absolute value minus 1 (which represents the reverse parity of the transform coefficient level):

$$\text{par\_flag}[k]=(\text{absLevel}[k]-1)\,\&\,1.$$

gt1_flag[k] specifies whether the remainder (given by sig_flag[k]=1 and the value of par_flag[k]) is greater than zero:

$$\text{gt1\_flag}[k]=(((\text{absLevel}[k]-1)>>1)>0\,?\,1:0),$$

where the operator ">>" specifies a bit-shift to the right (i.e., an integer division by 2).

In the second pass, the binary syntax elements gt2_flag are transmitted:

The binary syntax element gt2_flag[k] is only coded for those scan positions k for which a gt1_flag[k] equal to 1 was transmitted in the first pass. gt2_flag[k] specifies whether the remainder (given by sig_flag[k]=1 and the value of par_flag[k]) is greater than one:

gt2_flag[$k$]=(((absLevel[$k$]−1)>>1)>1?1:0).

In the third pass, the syntax elements remainder are transmitted:

The syntax element remainder[k] is only coded for those scan positions k for which a gt2_flag[k] equal to 1 was transmitted in the second pass. remainder[k] specifies the remainder of the absolute value (given by sig_flag [k]=1, gt1_flag[k]=1, gt2_flag[$k$]=1 and the value of par_flag[$k$]):

remainder[$k$]=((absLevel[$k$]−1)>>1)−2.

Finally, in the fourth pass, the syntax elements sign_flag are transmitted:

The syntax element sign_flag[k] is only coded for those scan positions k for which sig_flag[k] equal to 1 was transmitted are inferred in the first pass. sign_flag[k] specifies whether the transform coefficient level is negative:

sign_flag[$k$]=(level[$k$]<0?1:0).

At the decoder side, the syntax elements sig_flag[k], par_flag[k], gt1_flag[k], gt2_flag[k], remainder[k] and sign_flag[k] are decoded from the bitstream analogously. Note that all values of the syntax elements par_flag[k], gt1_flag [k], gt2_flag[k], remainder[k] and sign_flag[k] which are not transmitted are inferred to be equal to 0. In cases in which sig_flag[k] is not transmitted for a subblock with coded_subblock_flag equal to 1, its value is inferred to be equal to 1.

Given the coded and inferred values, the absolute value of a transform coefficient level at scan position k can be reconstructed as follows:

absLevel[$k$]=sig_flag[$k$]+par_flag[$k$]+2*(gt1_flag[$k$]+gt2_flag[$k$]+remainder[$k$]).

And, given the sign_flag[k] for absolute levels not equal to 0, the transform coefficient level is given by level[$k$]=(sign_flag[$k$]?−absLevel[$k$]:absLevel[$k$]).

The particular embodiment described above can be modified in one or more aspects, for example:

The coding of the transform coefficient levels may not be based on subblocks. That means, instead of splitting the coding of transform coefficient levels into subblocks, all transform coefficient levels of a transform block can be coded at once. In this case, the passes described above represent passes over all scanning positions inside a complete transform block. This approach could still be combined with a coding of the coded_block_flag as well as with an indication of the scan position of the first non-zero level in coding order (for example, by transmitting the x and y position or by any other means). This approach may also be combined with indications (similar to the coded_block_flag's) that specify that all transform coefficient levels inside a large region are equal to 0. The regions may represent subblocks, consecutive scan positions, or any other well-defined subsets of transform coefficient locations. The corresponding indications may be coded before the actual transform coefficient levels or they may be coded interleaved with the bins of the first pass.

The coding order of the flags par_flag and gt1_flag flag can be changed. Note that these flags do not depend on each other and, thus, the par_flag can be coded before the gt1_flag or the gt1_flag can be coded before the par_flag.

The meaning of the parity flag par_flag can be changed. Instead of signaling the parity of the absolute level minus 1, the parity of the absolute level could be transmitted (which is the same as the parity of the absolute level minus 2).

The meaning of the gt1_flag could be changed. Instead of signaling whether (absLevel−1)>>1 is greater than 0 (see above), we could also signal whether (absLevel−1−par_flag) is greater than 0. Or, if the meaning par_flag is changed as indicated above, gt1_flag could indicate whether (absLevel−1) is greater than 0. In both cases, the reconstruction formula would change to absLevel[$k$]=sig_flag[$k$]+par_flag[$k$]+gt1_flag[$k$]+2*(gt2_flag[$k$]+remainder[$k$])

and the meaning of gt2_flag and remainder would change to gt2_flag[$k$]=(((absLevel[$k$]−2)>>1)>0?1:0) remainder [$k$]=((absLevel[$k$]−2)>>1)−1

See, for instance, FIG. 19, where the flags are distributed onto the passes differently and the reconstruction of the quantization index involves absQIdx=sig_flag+gt1_flag+par_flag+2*(gt3_flag+remainder) with a partial reconstruction feasible after the first pass shown in FIG. 19 being absQIdx1=sig_flag+gt1_flag+par_flag+2*gt3_flag.

The first pass could be modified in a way that only the sig_flag and par_flag are transmitted in this pass. The gt1_flag could be move to the second pass, or it could be transmitted in a separate pass between the described first and second pass. Alternatively, additional flags (for example, the gt2_flag) could be coded as part of the first pass.

The second pass (with the gt2_flag's) could be omitted, in which case the pass with the syntax elements remainder would be directly coded after the first pass. In one embodiment, the second pass is omitted, because gt2_flag is already coded as part of the first pass (see above). In another embodiment, the second pass is omitted, because gt2_flag is not transmitted at all. In the latter case, the meaning of the syntax element remainder changes to remainder[$k$]=((absLevel[$k$]−1)>>1)−1 and the reconstruction formula changes to absLevel[$k$]=sig_flag[$k$]+par_flag[$k$]+2*(gt1_flag[$k$]+remainder[$k$])

or, when the meaning of gt1_flag changes as described above, the reconstruction formula changes to absLevel[$k$]=sig_flag[$k$]+par_flag[$k$]+gt1_flag[$k$]+2*remainder[$k$]

Alternatively, the second pass may include additional flags. For example, an additional gt3_flag with the meaning gt3_flag[$k$]=(((absLevel[$k$]−1)>>1)>2?1:0)

could be transmitted. Or, as noted above, the gt1_flag can be moved from the first to the second pass. This could also be combined with a gt3_flag.

It is also possible that the maximum number of gtx_flag that are transmitted for a current scan position is adaptively determined based on already coded data (e.g., based on the sum of the absolute values in a local neighborhood that can be derived based on already coded data).

One or more additional passes with regular coded bins could be coded between the second pass (with the gt2_flag's) and the third pass (syntax elements remainder). For example, gt3_flag's could be transmitted in an additional pass.

The bypass-coded bins of the syntax elements remainder and the bypass-coded sign_flag's could be coded interleaved in a single pass.

Two or more of the points listed above could also be combined.

Briefly summarizing above embodiments, in the following, further embodiments are described again. In doing so, we use reference signs pointing to above discussed figures.

In particular, above embodiments described a concept for decoding a block (10) of transform coefficients 12 where the transform block 10 may or may not be subdivided into sub-blocks 14.

The decoding is done in passes. In one or more first passes of scanning the transform coefficients, a decoding of a significance flag for the current transform coefficients which indicates whether a quantization index of the transform coefficients is zero, and a decoding of a parity flag for the transform coefficients which indicates a parity of the transform coefficients, takes place. As the pseudo codes in the figures analogously show the decoding procedure by turning "code" into "decode", the just mentioned tasks take place at 16 and 18, respectively. They are contained in one first pass 20 in FIG. 18, but may be distributed onto two separate passes according to an alternative. Both tasks 16 and 18 are done using context-adaptive entropy decoding which may be context-adaptive binary arithmetic decoding.

In one or more second passes 22 of scanning the transform coefficients, a decoding 24 of one or more greatness flags for transform coefficients the quantization index of which is not zero. In FIG. 18, there are two such passes 22' and 22". The one or more greatness flag passes 22 need not to be separate from the one or more first passes 20. In FIG. 18, gt1_flag decoding 24' takes place in pass 22' which, concurrently, is the first pass 20, while gt3_flag decoding 24' takes place in a separate pass 22". FIG. 19 shows that the one or more first passes 20 and the one or more second passes 22 may coincide. Here, in FIG. 19, decoding 16, 18 and 24 takes place in the same pass(es). In FIG. 19, there is exemplarily one such pass indicated by a curly bracket indicative of that pass serving as significance/parity pass 20 as well as greatness flag pass 22. Again, task 24 is done using context-adaptive entropy decoding which may be context-adaptive binary arithmetic decoding. In FIG. 18 and FIG. 19, exemplarily two greatness flags are decoded, but this is just an example.

In one or more third passes 26, 27, namely two mutually separate passes in case of FIGS. 18 and 19, which are separate to passes 20, 22, a decoding 28 of a remainder of the quantization index of the transform coefficients the one or more greatness flags of which are positive, such as indicated by being one, i.e. of the those coefficients whose greatness confirm/approve the greatness, and decoding 30 of a sign of the quantization index of the transform coefficients the quantization index of which is not zero, takes place. Tasks 28 and 30 are done using equiprobability entropy decoding which may be equiprobability binary arithmetic decoding. In particular, decoding 28 may involve using bins of a binarization and equiprobability binary arithmetic decoding of the bins of the binarization of the remainder of an absolute value of the quantization index of the transform coefficients the one or more greatness flags of which are positive.

The advantage of separating the passes in any of the above manners, has been motivated above and will become clear also from the description of the following possibilities in performing, for instance, dequantization and/or context-derivation, which details are, however, to be seen as being non-limiting the scope of the subsequent claims. The advantage lies in providing a basis of transform block description which is effectively codable using dependent quantization and context adaptive entropy coding such as context adaptive binary arithmetic coding.

As shown in FIGS. 18 and 19, in one first pass 20, for a currently scanned transform coefficient, the decoding 16, using the context-adaptive entropy decoding, of the significance flag for the currently scanned transform coefficient may be done, and then, if the significance flag indicates that the quantization index of the currently scanned transform coefficient is not zero, as checked at 32, the decoding 18, for the currently scanned transform coefficient, using the context-adaptive entropy decoding, the parity flag for the currently scanned transform coefficient takes place. Alternatively, separate first passes 20 could have been used for both flags. In the one of the one or more second passes 22, namely in 22' and 22" in FIGS. 18, and 22 which is concurrently pass 20 in case of FIG. 19, there takes place, for a currently scanned transform coefficient, a decoding 24', 24" of, using the context-adaptive entropy decoding, a greatness flag for the currently scanned transform coefficient, if the quantization index of the currently scanned transform coefficient is not zero, which circumstance is checked at 32. Note that this first greatness flag might have different definitions as explained above, and might be gt1_flag or gt3_flag. In case of FIG. 19, the decoding 18, and in case of FIGS. 18 and 19, the decoding 24" even takes place only in case of greatness flag gt1_flag for the currently scanned transform coefficient having been positive which circumstance is checked at 34. That is, for the currently scanned coefficient, the order of the coding/decoding of the flags is: significance flag, greatness flag gt1_flag, parity flag and, in case of FIG. 18, greatness flag gt2_flag and, in case of FIG. 19, greatness flag gt3_flag.

As mentioned above, from the mentioned flags, the computation of, for a predetermined transform coefficient, the quantization index may involve, in case of FIG. 18 and FIG. 19, a sum, addends of which are formed by: one addend is formed by the significance flag of the predetermined transform coefficient, one addend is formed by the parity flag of the predetermined transform coefficient, and one addend is formed by two times a sum of the remainder of the predetermined transform coefficient and one greatness flag, namely gt2_flag in case of FIG. 18 and gt3_flag in case of FIG. 19.

In one of the one or more second passes 22, namely in 22" in FIGS. 18, and 22 which is concurrently pass 20 in case of FIG. 19, there takes place, for a currently scanned transform coefficient, and if a previous greatness flag of the currently scanned transform coefficient is positive, a decoding 24", using the context-adaptive entropy decoding, of a further greatness flag for the currently scanned transform coefficient, namely gt2_flag in case of FIG. 18 and gt3_flag in case of FIG. 19. In case of FIG. 18, for a predetermined transform coefficient, the absolute value of the quantization index is computed according to a sum, addends of which are formed by one addend being the significance flag of the predetermined transform coefficient, one addend being the parity flag of the predetermined transform coefficient, one addend being two times a sum of the remainder of the predetermined transform coefficient, the first greatness flag and the second greatness flag. However, using a different definition of the greatness flags, such as according to FIG. 19, for example, but not exclusively, where the decoding 16, using the context-adaptive entropy decoding, of the significance flag for the currently scanned transform coefficient is done, and then, if the significance flag indicates that the quantization index of the currently scanned transform coefficient is not zero, as checked at 32, the decoding 24', for the currently scanned transform coefficient, using the context-adaptive entropy decoding, the greatness flag gt1_flag for the currently scanned transform coefficient takes place, and then, if the this greatness flag is positive, as checked at 34, the decoding 18, for the currently scanned transform coefficient, using the context-adaptive entropy decoding, the parity flag and the decoding 24" for the currently scanned transform coefficient, using the context-adaptive entropy decoding, the further greatness flag gt3_flag for the currently scanned transform coefficient takes place, the absolute value of the quantization index for a predetermined transform coefficient, such as the currently one, is computed according to a sum, addends of which are formed by one addend being the significance flag of the predetermined transform coefficient, one addend being the parity flag of the predetermined transform coefficient, one addend being the greatness flag gt1_flag of the predetermined transform coefficient, and one addend being two times a sum of the remainder of the predetermined transform coefficient and the further greatness flag gt3_flag. The decoding 24' and 24" of the first greatness flag and the second greatness flag may be done in separate second passes 22' and 22" as illustrated in FIG. 18, or on one as illustrated in FIG. 19.

As an alternative to FIG. 12, it would be possible to, in one of the one or more first passes, for a currently scanned transform coefficient, decode 16, using the context-adaptive entropy decoding, the significance flag for the currently scanned transform coefficient, and then, after the one first pass, in the one or more second passes, decode 24', 24", using context-adaptive entropy decoding, a sequence of more than one greatness flags for the transform coefficients, and then, after the one or more second passes, in a further one of the one or more first passes, decode, using equiprobability entropy decoding, the parity flag for the transform coefficients the quantization index of which is not zero.

As already noted above, the coding/decoding may be done in subblocks so that the transform coefficients are decoded subblock by subblock, where all passes over the scanning positions of a subblock are decoded before the first pass of the next subblock is decoded.

Each coefficient, whose binarization, i.e. all significance, parity and greatness flags and the remainder and sign, has been decoded, may be reconstructed by dequantizing the quantization index of each transform coefficient the quantization index of which is not zero by selecting, for the respective transform coefficient, a set of reconstruction levels out of a plurality of reconstruction level sets, namely two in the above example, "Set 0" and "Set 1" in FIGS. 7 and 10. This is done by use of the current state state, according to "setId[state]". The state, in turn, is derived depending on parities of quantization indices of transform coefficients preceding, along a scanning order, the respective transform coefficient, namely by updating the state used for the previously dequantized coefficient by the parity of the latter at 40 in FIG. 11, for instance. After selection, the dequantizing the respective transform coefficient onto one level of the selected set of reconstruction levels, which is indexed by setId, takes place. This level is the one indexed by the quantization index of the respective transform coefficient. As described, the selecting, for the respective transform coefficient, the set of reconstruction levels out of the reconstruction level sets is done using a state transitioning by selecting the correct set of reconstruction levels out of the plurality of reconstruction level sets uniquely based on a state which the state transitioning assumes for the respective transform coefficient, namely at 42 in FIG. 11, and updating 40 the state of the state transitioning for a transform coefficient succeeding in the scanning order depending on the parity of the quantization index of the respective transform coefficient. The scanning order is here, thus, the same used for the passes 20, 22, 27, and 30. Examples have been presented above. One has been exemplified in FIG. 4 by arrow 44. Again, subblock sub-divisioning is optional, just as the decoding of the coefficients subblock by subblock is, i.e. each pass may alternatively proceed to traverse the subblocks before a next pass is commenced instead of performing all passes for one subblock before proceeding to the next. Four distinct states for the state transitioning may exist. The transitioning may be implemented using a table as illustrated in Table 1 and at 45 into which a look-up is performed to yield the state for the following coefficient, or using a trellis diagram as illustrated in FIG. 12, for instance, where the states appear at 46.

As described above, the plurality of reconstruction level sets may be parametrized by way of a predetermined quantization step size $\Delta$ as shown in FIGS. 7 and 10. An information on the predetermined quantization step size may be conveyed in the data stream. Each of the reconstruction level sets may consist of multiples of this predetermined quantization step size constant for, or equal among, the plurality of reconstruction level sets as illustrated in FIGS. 7 and 10 using the common horizontal axis t. The number of reconstruction level sets may be two as illustrated in FIGS. 7 and 10 and a first reconstruction level set may comprise zero and even multiples of a predetermined quantization step size, such as set 0 in FIGS. 7 and 10, and a second reconstruction level set may comprise zero and odd multiples of the predetermined quantization step size as set 1 in FIGS. 7 and 10. The first reconstruction level set might be selected for the state values 0 and 1, and the second reconstruction level set for the state values 2 and 3 as illustrated in Table 1.

Note that, if above dependent quantization scheme is used, after decoding 18 the parity of a certain coefficient, the state variable state defining the next coefficient's quantization set is defined or may be determined, and that this state may be used for coding the next coefficient's significance and parity flag.

We now attend to the context selection for performing the decoding 16, 18 and 24 and describe advantageous context modelling concepts.

In an advantageous embodiment, the adaptive probability models that are used for the regular-coded bins are chosen among sets of multiple adaptive probability models. The probability models are also referred to as contexts and the selection of a probability model is also referred to as context modeling. In an advantageous embodiment, the selected probability models depend on one or more of the following properties:

The color plane. Typically, luma and chroma transform coefficients have different statistical properties and, hence, the coding efficiency can typically be improved if different sets of probability models are used for luma and chroma. It is also possible that a separate set of probability models is used for each color plane (e.g., Y, Cb, Cr).

The diagonal position given by the sum of the x and y coordinate inside the transform block, diag=x+y. On average, the absolute values of the transform coefficients increase with decreasing diagonal position diag. Due to that reason, the compression efficiency can typically be increased if the diagonal positions are partitioned into two or more classes and a separate set of probability models is used for each class.

The state variable that applies to the current transform coefficient. As noted above, the two quantizers Q0 and Q1 have different sets of admissible reconstruction levels. As a consequence, the probability mass functions for the two quantizers differ significantly. This aspect has the greatest effect on the probability for the sig_flag (which indicates whether a transform coefficient level is not equal to 0). Hence, the compression efficiency can be increased if different sets of probability models are used for the two quantizers. As an extension of this concept, different sets of probability models can be used for the different values of the state variable (which can take 4 possible values: 0, 1, 2, 3). Or different sets of probability models can be used for different values of a defined function of the state variable. Note that using different sets of probability models for the two different quantizers represents the special case of the latter approach.

The dependency on the state variable may not be suitable for all bins, since it increases the total number of probability models and, thus, decreases the speed of probability adaptation. Hence, different sets of probability models for different values of a function of the state variable may only be used for a subset of the regular-coded bins. For example, only for the sig_flag's. Or only for the sig_flag's and the par_flag's (or any other subset).

An activity measure inside a local neighborhood around the current scan position. Typically, the likelihood that the absolute value of a current transform coefficient exceeds a certain threshold increased with the activity inside a local neighborhood, where activity refers, for example. to the sum of absolute transform coefficient levels in the neighborhood. The aspect can be exploited for increasing the compression efficiency by using different probability measures for different local activity measures. It should, however, be noted that since we code the absolute values in multiple passes only those data that are available in a certain pass can be used.

In the following, we describe an exemplarity setup for the context modeling (selection of probability models) in more detail. The example refers to a coding order of bins specified in FIG. 18. However, this concept is not restricted to this particular example and may, for instance, easily transferred to the modifications of the coding order described above such as the one which FIG. 19 refers to.

Figure 16:
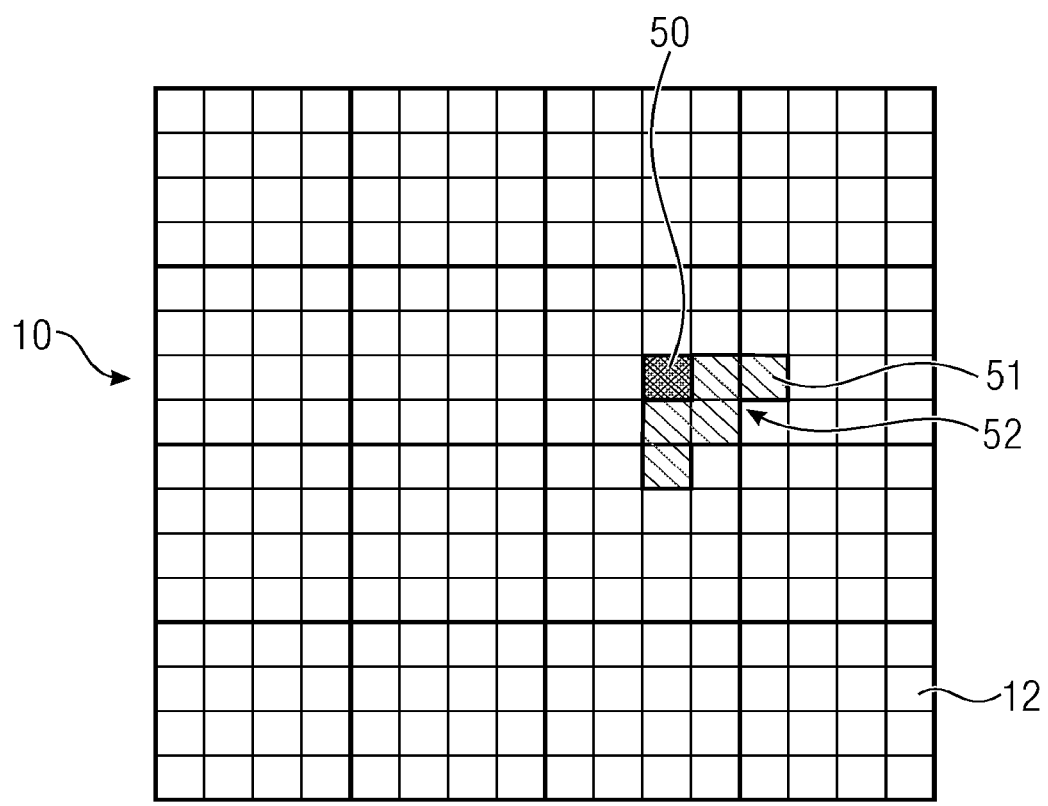
FIG. 16 shows a schematic diagram of a transform block and illustrates a template used for selecting probability models. The black square specifies the current scan position and the shaded squares represent the local neighborhood used for deriving the context models.

For deriving local activity measures, the local template shown in FIG. 16 may be used in an advantageous embodiment. It is also possible to use a different template, for example a template that includes more or less neighboring scanning positions. Typically, it is advantageous if the template used does only include scan positions that precede the current scan position in coding order 44.

Let T(k) denote the set of scan position in the local template 52. Then, let sumAbs be the sum of the absolute values in the local template given by $$\text{sumAbs}[k] = \sum_{i \in T(k)} \text{absLevel}[i]$$

Furthermore, let numSig be the number of absolute levels greater than zero in the local template, $$\text{numSig}[k] = \sum_{i \in T(k)} (\text{absLevel}[i] > 0\,?\,1:0) = \sum_{i \in T(k)} \text{sig\_flag}[i]$$

Values of absLevel[i] and sig_flag[i] that refer to positions outside the current transform block are inferred to be equal to 0.

The measure numSig can be already derived based on the values of the sig_flag's. However, the sum of absolute levels sumAbs is only available in the third (and fourth) pass, 26 and 27. In the first and second pass 20 and 22", only a subset of the information is coded and, thus, only this subset of information can be used for context modeling.

According to the advantageous embodiment shown in the pseudo-code of FIG. 18, the bins sig_flag, par_flag, and gt1_flag are transmitted in the first pass 20/22'. Based on these data for a certain transform coefficient level, we can conclude the following:

If sig_flag is equal to 0, the transform coefficient level is equal to 0: level=0;

If sig_flag is equal to 1, par_flag is equal to 0, and gt1_flag is equal to 0, the transform coefficient level is equal to 1: level=1;

If sig_flag is equal to 1, par_flag is equal to 1, and gt1_flag is equal to 0, the transform coefficient level is equal to 2: level=2;

If sig_flag is equal to 1, par_flag is equal to 0, and gt1_flag is equal to 1, the transform coefficient level is greater than or equal to 3: level>=3;

If sig_flag is equal to 1, par_flag is equal to 1, and gt1_flag is equal to 1, the transform coefficient level is greater than or equal to 4: level>=4.

Hence, we can at least derive a minimum value for the absolute transform coefficient level according to minAbs1[k]=sig_flag[k]+par_flag[k]+2*gt1_flag[k].

In the second pass, we additionally know that value of gt2_flag and can thus derive the following minimum value:

minAbs2[k]=sig_flag[k]+par_flag[k]+2*(gt1_flag[k]+gt2_flag[k]).

The corresponding sums of minimum absolute values are denoted by sumAbs1 and sumAbs2 and are given by $$\text{sumAbs1}[k] = \sum_{i \in T(k)} \text{minAbs1}[i]$$

and $$\text{sumAbs2}[k] = \sum_{i \in T(k)} \text{minAbs2}[i]$$

Values of minAbs1[i] and minAbs2[i] that refer to positions outside the current transform block are inferred to be equal to 0.

In this context, it should be noted that the exact equation for calculating minAbs1[k] and minAbs2[k] (and, as a consequence, the final values for sumAbs1[k] and sumAbs2[k]) depend on which bins are included into the first pass as well as on the semantics (i.e., meaning) of these bins. For example, if gt2_flag[k] is included in the first pass or if the meaning of gt1_flag[k] is modified (both alternatives have been described above), the equation for calculating minAbs1[k] has to be changed accordingly. For example, this minimum is minAbs1=sig_flag+gt1_flag+par_flag+2*(gt3_flag+remainder) in case of FIG. 19 during the first pass 20/22. In any case, minAbs1[k] represents the minimum value of the absolute level that can be derived on the basis of the bins that are coded in the first pass.

The values sumAbs, numSig, sumAbs1 and sumAbs2 or functions of these values can be used as local activity measures for context modeling. Detailed examples are described in the following.

In an alternative embodiment, the values sumAbs, minAbs1 and minAbs2 are not determined based on the transmitted transform coefficient levels, but based on the associated multiplication factors (absolute values) for the quantization step size. These data can be derived based on the transform coefficient levels and the associated state variables. Given the absolute levels absLevel[k] and the associated state variable state[k], the multiplication factor for the quantization step size qIdx[k] can be determined according to $$qIdx[k]=2*absLevel[k]-(state[k]>>1)$$

Similar values replacing minAbs1 and minAbs2 can be derived according to $$minQIdx1[k]=2*minAbs1[k]-(state[k]>>1)$$

$$minQIdx2[k]=2*minAbs2[k]-(state[k]>>1)$$

Given these values alternative values sumQAbs, sumQAbs1, and sumQAbs2 that replace sumAbs, sumAbs1, and sumAbs2 can be derived according to:

$$sumQAbs[k] = \sum_{i \in T(k)} qIdx[i]$$

$$sumQAbs1[k] = \sum_{i \in T(k)} minQIdx1[i]$$

$$sumQAbs2[k] = \sum_{i \in T(k)} minQIdx2[i]$$

In the following description, we use the values sumAbs, sumAbs1, and sumAbs2. But it should be kept in mind that these values can be replaced with the values sumQAbs, sumQAbs1, and sumQAbs2. When using the values sumQAbs, sumQAbs1, and sumQAbs2, it can be advantageous to use different functions of these values in the context derivation.

Context Modeling for the Significance Flag sig_flag

The adaptive probability model for coding a current sig_flag is chosen among a set of probability models. For simplicity, let us assume that the available probability models are organized in a 4-dimensional array probModelSig[cSig][sSig][dSig][aSig], where cSig specifies an index that depends on the current color channel, sSig specifies an index that depends on the state variable, dSig specifies an index that depends on the diagonal position (or more generally, the x and y location) inside the transform block, and aSig specifies an index that depends on a local activity measure. The actual organization of the probability models is an aspect of the actual implementation. They can, for example, be organized as a 1-d array, in which case a combined index can be derived based on the values of cSig, sSig, dSig, and aSig.

In the following, we describe example methods for deriving the indexes cSig, sSig, dSig, and aSig. It should, however, be noted that different ways of deriving these indexes (or a part of the indexes) are possible.

Color Channel Index cSig

In an advantageous embodiment, the color channel index cSig is set equal to 0 if and only if the current color channel represents the luma channel (or, more generally, the first color channel). And cSig is set equal to 1 if an only if the current color channel represents a chroma channel (or, more generally, not the first color channel):

$$cSig=(\text{current channel is luma}?0:1)$$

As an alternative, cSig could be set equal to 0 for the luma channel, equal to 1 for the Cb channel, and equal to 2 for the Cr channel.

State Index sSig

In an advantageous embodiment, the index sSig is set equal to $$sSig = \begin{cases} 0: & \text{state} \leq 1 \\ 1: & \text{state} = 2 \\ 2: & \text{state} = 3 \end{cases}$$

That means, one set of probability models is used for the state variables equal to 0 and 1, a second set is used for the state variable equal to 2, and a third set is used for the state variable equal to 3.

As an alternative, the index sSig could be set equal to the state variable (sSig=state), in which case a separate set of probability models would be used for each possible value of the state variable. Or as another alternative, the index sSig could be set according to sSig=state>>1, in which case a separate set of context models would be used for each of the two quantizers Q0 and Q1 (note that the quantizer Q0 is used when state is equal to 0 or 1, and the quantizer Q1 is used when state is equal to 2 or 3).

Location Index dSig

In an advantageous embodiment, the index dSig is set as follows:

If the index cSig is equal to 0 (i.e., the current color channel represents the luma channel), then dSig is set according to $$dSig = \begin{cases} 0: & \text{diag} < 2 \\ 1: & 2 \leq \text{diag} < 5 \\ 2: & 5 \leq \text{diag} \end{cases}$$

If the index cSig is equal to 1 (i.e., the current color channel represents a chroma channel), then dSig is set according to $$dSig = \begin{cases} 0: & \text{diag} < 2 \\ 1: & 2 \leq \text{diag} \end{cases}$$

Here, diag represent the diagonal position given by diag=x+y, where x and y represent the x and y coordinates of the current scan position inside the transform block.

Alternatively, any other clusterings of the diagonal positions are possible. Or alternatively, the (x,y) locations inside the transform block can be partitioned into multiple classes and the index dSig can be set equal to the corresponding class index.

Local Activity Index aSig

Finally, in an advantageous embodiment of the invention, the index aSig is set according to $$aSig=\min(5,\text{sumAbs}1),$$

where sumAbs1 refers to the sum of the minimum absolute transform coefficient levels in the local template that are given by the data transmitted in the first pass (see above).

As alternative, different maximum values or different functions of sumAbs1 can be used.

Context Modeling for the Parity Flag Par_Flag

The adaptive probability model for coding a current par_flag is chosen among a set of probability models. Similarly as for the significance flag, let us assume that the available probability models are organized in a 4-dimensional array $$\text{probModelPar}[cPar][sPar][dPar][aPar],$$

where cPar specifies an index that depends on the current color channel, sPar specifies an index that depends on the state variable, dPar specifies an index that depends on the diagonal position (or more generally, the x and y location) inside the transform block, and aPar specifies an index that depends on a local activity measure.

Color Channel Index cPar

Similarly as for the significance flag, in an advantageous embodiment, the color channel index cSig is set according to:

$$cPar=(\text{current channel is luma?0:1})$$

Alternatively, the alternatives described above for cSig could be used.

State Index sPar

In an advantageous embodiment, the index sPar is set equal to 0. That means, the chosen probability model does not depend on the state variable.

Alternatively, any of the methods described above for sPar could be used.

Location Index dPar

In an advantageous embodiment, the index dPar is set as follows:

If the index cPar is equal to 0 (i.e., the current color channel represents the luma channel), then dPar is set according to $$dPar = \begin{cases} 0: firstNonZero \\ 1: !firstNonZero \,\&\&\, \text{diag} = 0 \\ 2: !firstNonZero \,\&\&\, 0 < \text{diag} < 3 \\ 3: !firstNonZero \,\&\&\, 3 \le \text{diag} < 10 \\ 4: !firstNonZero \,\&\&\, 10 \le \text{diag} \end{cases}$$

If the index cPar is equal to 1 (i.e., the current color channel represents a chroma channel), then dPar is set according to $$dPar = \begin{cases} 0: firstNonZero \\ 1: !firstNonZero \,\&\&\, \text{diag} = 0 \\ 2: !firstNonZero \,\&\&\, 0 < \text{diag} \end{cases}$$

At this diag represent the diagonal position given by diag=x+y, where x and y represent the x and y coordinates of the current scan position inside the transform block. The boolean variable firstNonZero specifies whether the current scan position represents the scan position of the first non-zero level in coding order (i.e., the position that is identified by the x and y coordinates (or similar means) that are transmitted after the coded block flag). Hence, for the first non-zero level in coding order, a different set of probability models is used (independent of the diagonal position).

Alternatively, any other clusterings of the diagonal positions are possible. Or alternatively, the (x,y) locations inside the transform block can be partitioned into multiple classes and the index dPar can be set equal to the corresponding class index.

Local Activity Index aPar

Finally, in an advantageous embodiment of the invention, the index aPar is set according to $$aPar=\min(4,\text{sumAbs}1-\text{numSig}),$$

where sumAbs1 refers to the sum of the minimum absolute transform coefficient levels in the local template that are given by the data transmitted in the first pass (see above). And numSig refers to the number of non-zero levels (i.e., the number of sig_flag's equal to 1) in the local template (see description above). As alternative, different maximum values or different functions of sumAbs1 and numSig can be used.

Context Modeling for the Flag Gt1_Flag

The adaptive probability model for coding a current gt1_flag is chosen among a set of probability models. Similarly, as for the significance flag, let us assume that the available probability models are organized in a 4-dimensional array $$\text{probModelGt1}[cGt1][sGt1][dGt1][aGt1],$$

where cGt1 specifies an index that depends on the current color channel, sGt1 specifies an index that depends on the state variable, dGt1 specifies an index that depends on the diagonal position (or more generally, the x and y location) inside the transform block, and aGt1 specifies an index that depends on a local activity measure.

In an advantageous embodiment of the invention, the indexes cGt1, sGt1, dGt1, and aGt1 are derived in the same ways as the indexes cPar, sPar, dPar, aPar described above:

$$cGt1=cPar$$

$$sGt1=sPar$$

$$dGt1=dPar$$

$$aGt1=aPar$$

It should be noted that using the same context index is different than using the same probability model. While the derivation of the context model index is the same for the gt1_flag and the par_flag, the sets of probability models are disjoint. That means, one set of probability model is used for the par_flag and another set of probability models is used for the gt1_flag.

Note that the context selection for the gt1_flag does not depend on the value of the directly preceding par_flag.

Alternatively, the indexes cGt1, sGt1, dGt1, and aGt1, can be derived by any of the methods described above with respect to the significance flag.

Furthermore, the selected probability model can additionally depend on the value of the directly preceding parity flag par_flag, so that different sets of probability models are used for each of the two parity values. This would, however, introduce a direct dependency between par_flag and gt1_flag.

Context Modeling for the Flag gt2_flag

The adaptive probability model for coding a current gt2_flag is chosen among a set of probability models. Similarly, as for the significance flag, let us assume that the available probability models are organized in a 4-dimensional array probModelGt2[cGt2][sGt2][dGt2][aGt2], where cGt2 specifies an index that depends on the current color channel, sGt2 specifies an index that depends on the state variable, dGt2 specifies an index that depends on the diagonal position (or more generally, the x and y location) inside the transform block, and aGt2 specifies an index that depends on a local activity measure.

In an advantageous embodiment, the indexes cGt2, sGt2, dGt2, and aGt2 are derived in the same ways as the indexes cGt1, sGt1, dGt1, aGt1 described above:

$cGt2=cGt1$ $sGt2=sGt1$ $dGt2=dGt1$ $aGt2=aGt1$

Similarly as for the gt1_flag, it should be noted that (even though the context indexes are the same for coding the gt2_flag and gt2_flag), in general, different sets of probability models are used for the gt1_flag and gt2_flag. As a special case, it is however also possible to use exactly the same probability models for these two flags.

Alternatively, the indexes cGt2, sGt2, dGt2, and aGt2, can be derived by any of the methods described in with respect to the afore-discussed flags.

Furthermore, for deriving the local activity index aGt2, the additional information of the gt2_flag in the local neighborhood can be used (in case, the gt2_flag is coded in a second pass). For example, the activity index could be set according to $aGt2=\min(4,sumAbs2-numSig)$, where sumAbs2 refers to the sum of the minimum absolute transform coefficient levels in the local template that are given by the data transmitted in the first and second pass (see above).

As alternative, different maximum values or different functions of sumAbs2, sumAbs1, and numSig can be used.

Turning now to the discussion of FIGS. 18 and 19, this means, in other words, the following. As described, the decoding 16 of the significance flag for a predetermined transform coefficient may involve selecting the context for performing the decoding 16 depending on a coefficient position of the predetermined transform coefficient inside the transform block.

This position is indexed by parameter k in FIGS. 18 and 19. Additionally or alternatively, the significance flag for a predetermined transform coefficient 50 is, as illustrated above with respect to FIG. 16, decoded by determining a local activity based on a set of flags decoded prior to the significance flag of the predetermined transform coefficient for a set of neighboring transform coefficients 51 within a local template 52 around, or located at the position of, the predetermined transform coefficient 50, and selecting the context depending on the local activity. As done in FIG. 18 and FIG. 19, for instance, the significance flag, the parity flag and one of the one or more greatness flags or, as in case of FIG. 19, all greatness flags, may by coded/decoded in one pass so that the set of flags decoded for coefficients 51 in template 52 comprises these flags as decoded for the set of neighboring transform coefficients 51 in template 52, and the activity may be computed based on a sum which has an addend for each of the neighboring transform coefficients 51, the addend indicating a minimally assumed index or a minimally assumed reconstruction level for the respective neighboring transform coefficient 51 determined based on said flags previously decoded for the respective neighboring transform coefficient. Minimally assumed value means, a minimum threshold for the quantization index or reconstruction level which the respective neighboring coefficient minimally assumes based on an analysis of the previously flags derived for the respective neighboring coefficient 51. The minimum may be defined in absolute sense. In case of FIG. 19, for instance, this minimum may be computed as sig_flag+gt1_flag+par_flag+2*gt3_flag for each coefficient 51 as only the remainder may be missing for any coefficient. For coefficients 51 whose previously coded/decoded flag set excludes certain flags such as par_flag and gt3_flag because of gt1_flag being zero, then the respective flag has a default value of zero. The significance flag for a predetermined transform coefficient may be coded/decoded using a context which is, even additionally or alternatively, selected depending on the state 46 which the state transitioning assumes for this predetermined transform coefficient. For example, one context set may be defined and selected for states 0 and 1, another context set for state 2, and a third context set for state 3. Within the selected context set, the selection of the finally used context may then be performed using any of the previously mentioned dependencies, such as depending on the local activity. Instead of the state, the currently chosen reconstruction set, e.g. setId, may be used.

For the parity flag, the context selectivity may be designed similarly. That is, the parity flag for a predetermined transform coefficient may be coded/decoded using a context which is selected depending on one or more of 1) a coefficient position of the predetermined transform coefficient, 2) a local activity which is based on a set of flags decoded prior to the parity flag of the predetermined transform coefficient for a set of neighboring transform coefficients 51 within a local template 52 around the predetermined transform coefficient 50, 3) a number of transform coefficients 51 within the local template 52 around the predetermined transform coefficient, the reconstruction level of which is not zero, and selecting a context depending on the local activity and/or the number of transform coefficients, or 4) a difference between the local activity and the number of transform coefficients.

For the greatness flags, such as the any of gt1_flag, gt2_flag and gt3_flag, the context selectivity may be designed similarly. That is, same may be coded/decoded for a predetermined transform coefficient using a context which is selected depending on one or more of 1) a coefficient position of the predetermined transform coefficient, 2) a local activity determined based on a set of flags decoded prior to the first greatness flag of the predetermined transform coefficient for a set of neighboring transform coefficients 51 within a local template 52 around, or located at, the predetermined transform coefficient, 3) a number of transform coefficients within the local template 52, the reconstruction level of which is not zero, and/or 4) a difference between the local activity and the number of transform coefficients.

As to the binarization of the remainder, the following advantageous concepts may be used.

In an advantageous embodiment, the syntax element remainder is coded in the bypass-mode of the arithmetic coding engine (see above). The compression efficiency depends on the used binarization. In HEVC, a similar syntax element is coded using a class of binarization codes that are referred to as Golomb-Rice codes. This class of codes is parametrized by a so-called Rice parameter. In HEVC, the Rice parameter is adjusted during coding, so that the used binarization depends on previous syntax elements.

In an advantageous embodiment, the same class (or a very similar class) of Golomb-Rice codes as in HEVC is used for binarizing the syntax element remainder. In contrast to HEVC, the derivation of the Rice parameter has to be modified since the level information of the remainder is divided by two.

In an advantageous configuration, the Rice parameter is derived using the absolute sum of the neighboring levels covered by the local template, sumAbs (see above). In a particularly advantageous embodiment, the Rice parameter RP is derived according to $$RP = \begin{cases} 0 : sumAbs < 12 \\ 1 : 12 \le sumAbs < 25 \\ 2 : 25 \le sumAbs \end{cases}$$

In other configurations, the thresholds for switching the Rice parameter can be modified. Or the Rice parameter can be derived based on other activity measures of the local template. Moreover, it can be additionally specified that the Rice parameter is disallowed to become smaller within a subblock.

As an alternative, the Rice parameter could be modified in a similar way as in HEVC.

That is, a Rice parameter selection may be performed in the decoding 28 the remainder.

In the embodiment of FIG. 18, for instance, which was described above, the parity syntax element is transmitted directly after the significance information. In this configuration, a direct bin-to-bin dependency only exists between the significance and the parity information. After the coding/decoding of the parity information, the gt1_flag is coded thereby closing the coding of the level information for the current scanning position in the first pass. After finishing the first scan pass 20/22', the gt2_flags are transmitted in the second scanning pass 22'. Finally, the remainder is transmitted in the scanning pass 26. This design minimizes the direct bin-to-bin dependency to the significance and the parity syntax element. Moreover, more level information can be evaluated for the context modeling for the significance flag thereby enabling a higher compression efficiency. The context modeling for the parity flag is exactly as the same as for the gt1 and gt2 flags resulting in less logic, and hence, less complexity.

In an alternative embodiment, the parity information is transmitted first before the absolute level information as illustrated in the pseudo-code of FIG. 20. Here, significance flag is transmitted in pass 20' before transmitting the parity flag in pass 20", before then the first greatness flag in pass 22' followed by the second greatness flag in pass 22" are transmitted The significance flag may only be used when the parity information is equal to 0, while it is inferred to be equal to 1 when the parity flag is equal to 1. An advantage of this configuration is that the direct bin-to-bin dependency does not exist. After the parity flags are transmitted in the first pass, the values of the state variables and, thus, the quantizers used for the individual transform coefficients are known.

The number of passes between the pass with the sig_flags and the pass with the bypass-coded remainder's can be chosen to be equal to zero such as in the case of FIG. 19 or to be equal to any value greater than zero. Furthermore, multiple flags can be transmitted inside a pass.

Further modification of above description relate to the following. The selected probability model for the parity flags par_flag may depend on one or more of the following parameters:

The color channel;
The state variable;
The parity flags in a local template around the current scan position;
The scan position (e.g., by clustering the diagonal positions).

The context modeling for the syntax elements following the parity may be conditioned on the parity information so that a different context model set is employed depending on the parity. In addition, they can depend on any of the parameters described described before for the parity flag.

In this configuration, the number of bins using context models is increased, e.g., to six (the last context coded syntax element is then GT5). Then, the parity information is transmitted in the bypass mode since the conditional probability is almost equiprobable. This configuration has the benefit that the compression efficiency of the design where the full information is transmitted for each scanning position can be achieved.

As to entropy coding in case of using independent scalar quantization the following is said.

Even though the entropy coding described above is specifically advantageous for transform coding with dependent quantization, it can also be advantageously applied to transform coding with conventional independent quantization. The only aspect that needs to be modified is the derivation of the state variable. In fact, for conventional independent quantization, the state variable can typically be set equal to 0. Note that the quantizer Q0 represent a conventional uniform reconstruction quantizer.

The fallback to conventional scalar quantization could be also achieved by modifying the state transition table to state_trans_table[4][2]={{0,0},{0,0},{0,0},{0,0}}

Since the state transition table can be represented as a single 16-bit integer (see above description), the same implementation can be used for dependent and independent scalar quantization. The used quantization method can be configured by the 16-bit value that represents the state transition table. Hence, the described method for entropy coding is also suitable for codecs that support a switch between dependent and independent quantization (e.g., on a sequence, picture, slice, tile, or block level).

Further embodiments relate to the following.

1. Apparatus for decoding a block of transform coefficients, configured to a) in one or more first passes of scanning the transform coefficients, decode, using context-adaptive binary arithmetic decoding, a significance flag for the transform coefficients which indicates whether a quantization index of the transform coefficients is zero, a parity flag for the transform coefficients which indicates a parity of the transform coefficients, and one or more greatness flags for transform coefficients the quantization index of which is not zero, and b) in one or more second passes, decode, using equiprobability binary arithmetic decoding, bins of a binarization of a remainder of an absolute value of the quantization index of the transform coefficients the one or more greatness flags of which are positive and a sign of the quantization index of the transform coefficients the quantization index of which is not zero.

2. Apparatus of embodiment 1, configured to, in one first pass, for a currently scanned transform coefficient, decode, using context-adaptive binary arithmetic decoding, the significance flag for the currently scanned transform coefficient and, if the significance flag indicates that the quantization index of the currently scanned transform coefficient is not zero, decode, for the currently scanned transform coefficient, using context-adaptive binary arithmetic decoding, the parity flag for the currently scanned transform coefficient.

3. Apparatus of embodiment 1 or 2, configured to, in the one or more first passes, for a currently scanned transform coefficient, if the quantization index of the currently scanned transform coefficient is not zero, decode, using context-adaptive binary arithmetic decoding, a first greatness flag for the currently scanned transform coefficient.

4. Apparatus of embodiment 3, configured to compute, for a predetermined transform coefficient, the absolute value of the quantization index according to a sum, addends of which are formed by the significance flag of the predetermined transform coefficient, the parity flag of the predetermined transform coefficient, and two times a sum of the remainder of the predetermined transform coefficient and the first greatness flag.

5. Apparatus of embodiment 3, configured to, in the one or more second passes, for a currently scanned transform coefficient, if the first greatness flag of the currently scanned transform coefficient is positive, decode, using context-adaptive binary arithmetic decoding, a second greatness flag for the currently scanned transform coefficient.

6. Apparatus of embodiment 5, configured to compute, for a predetermined transform coefficient, the absolute value of the quantization index according to a sum, addends of which are formed by the significance flag of the predetermined transform coefficient, the parity flag of the predetermined transform coefficient, the first greatness flag of the predetermined transform coefficient, and two times a sum of the remainder of the predetermined transform coefficient and the second greatness flag.

7. Apparatus of any of embodiments 1 to 6, configured to perform each of the one or more second passes after each of the one or more first passes.

8. Apparatus of any of the preceding embodiments, where the transform coefficients of a transform block are partitioned into subblocks, and the transform coefficients are decoded subblock by subblock, where all passes over the scanning positions of a subblock are decoded before the first pass of the next subblock is decoded.

9. Apparatus of any of embodiments 1 to 8, configured to dequantize the quantization index of each transform coefficient the quantization index of which is not zero by selecting, for the respective transform coefficient, a set of reconstruction levels out of a plurality of reconstruction level sets depending on parities of quantization indices of transform coefficients preceding, along a scanning order, the respective transform coefficient, and dequantizing the respective transform coefficient onto one level of the set of reconstruction levels which is indexed by the quantization index of the respective transform coefficient.

10. Apparatus of embodiment 9, configured to perform the selecting, for the respective transform coefficient, the set of reconstruction levels out of a plurality of reconstruction level sets using a state transitioning by selecting the set of reconstruction levels out of the plurality of reconstruction level sets uniquely based on a state which the state transitioning assumes for the respective transform coefficient, updating the state of the state transitioning for a transform coefficient succeeding in the scanning order depending on the parity of the quantization index of the respective transform coefficient.

11. Apparatus of embodiment 10, configured to perform the one or more first passes, and/or the one or more second passes along the scanning order.

12. Apparatus of embodiment 10 or 11, configured to perform the state transitioning transitions between four distinct states.

13. Apparatus of any of embodiments 9 to 12, configured to parametrize the plurality (50) of reconstruction level sets (52) by way of a predetermined quantization step size and derive information on the predetermined quantization step size from the data stream (14).

14. Apparatus of any of embodiments 9 to 13 wherein each of the plurality (50) of reconstruction level sets (52) consists of integer multiples of a predetermined quantization step size which is constant for the plurality (50) of reconstruction level sets (52).

15. Apparatus of any of embodiments 9 to 14, wherein the number of reconstruction level sets (52) of the plurality (50) of reconstruction level sets (52) is two and the plurality of reconstruction level sets comprises a first reconstruction level set comprising zero and even multiples of a predetermined quantization step size, and a second reconstruction level set comprising zero and odd multiples of the predetermined quantization step size.

16. Apparatus of embodiment 15, configured to select the first reconstruction level set for the state values 0 and 1, and select the second reconstruction level set for the state values 2 and 3.

17. Apparatus of any of embodiments 1 to 16, configured to decode, using context-adaptive binary arithmetic decoding, the significance flag for a predetermined transform coefficient by selecting a context depending on a coefficient position of the predetermined transform coefficient inside the transform block.

18. Apparatus of any of embodiments 1 to 17, configured to decode, using context-adaptive binary arithmetic decoding, the significance flag for a predetermined transform coefficient by determining a local activity based on a set of flags decoded prior to the significance flag of the predetermined transform coefficient for a set of neighboring transform coefficients within a local template around the predetermined transform coefficient, and selecting a context depending on the local activity.

19. Apparatus of embodiment 18, configured to decode the significance flag, the parity flag and the one or more greatness flags in one first pass so that the set of flags comprises the significance flag, the parity flag and the one or more greatness flags decoded for the set of neighboring transform coefficients, and to compute the local activity based on a sum over an addend for each of the neighboring transform coefficients, the addends indicating a minimally assumed index or a minimally assumed reconstruction level for the neighboring transform coefficients determined based on the significance flag, the parity flag and the one or more greatness flags decoded for the neighboring transform coefficients.

20. Apparatus of any of embodiments 1 to 19, configured to a) perform the selecting, for the respective transform coefficient, the set of reconstruction levels out of a plurality of reconstruction level sets using a state transitioning by selecting the set of reconstruction levels out of the plurality of reconstruction level sets uniquely based on a state which the state transitioning assumes for the respective transform coefficient, and updating the state of the state transitioning a transform coefficient succeeding in the scanning order depending on the parity of the quantization index of the respective transform coefficient, b) perform the one or more first passes along the scanning order, and c) decode, using context-adaptive binary arithmetic decoding, the significance flag for a predetermined transform coefficient by selecting a context depending on the state which the state transitioning assumes for the predetermined transform coefficient (13').

21. Apparatus of embodiment 20, configured to decode, using context-adaptive entropy decoding, the significance flag for a predetermined transform coefficient by selecting a context set comprising the context depending on the state and select the context out of the context set depending on a local activity around, or a coefficient position of the predetermined transform coefficient.

22. Apparatus of embodiment 21, wherein select a first context set for states 0 and 1, a second context set for state 2, and a third context set for state 3.

23. Apparatus of any of embodiments 1 to 22, configured to a) dequantize the quantization index of each transform coefficient the quantization index of which is not zero by selecting, for the respective transform coefficient, a set of reconstruction levels out of a plurality of reconstruction level sets depending on parities of quantization indices of transform coefficients preceding, along a scanning order, the respective transform coefficient, and dequantizing the respective transform coefficient onto one level of the set of reconstruction levels which is indexed by the quantization index of the respective transform coefficient, b) perform the one or more first passes along the scanning order, and c) decode, using context-adaptive binary arithmetic decoding, the significance flag for a predetermined transform coefficient by selecting a context depending on the set of reconstruction levels selected for the predetermined transform coefficient.

24. Apparatus of any of embodiments 1 to 23, configured to decode, using context-adaptive binary arithmetic decoding, the parity flag for a predetermined transform coefficient by selecting a context depending on a coefficient position of the predetermined transform coefficient inside the transform block.

25. Apparatus of any of embodiments 1 to 24, configured to decode, using context-adaptive binary arithmetic decoding, the parity flag for a predetermined transform coefficient by determining a local activity based on a set of flags decoded prior to the parity flag of the predetermined transform coefficient for a set of neighboring transform coefficients within a local template around the predetermined transform coefficient, and/or a number of transform coefficients within the local template around the predetermined transform coefficient, the reconstruction level of which is not zero, and selecting a context depending on the local activity and/or the number of transform coefficients.

26. Apparatus of embodiment 25, configured to select the context depending on a difference between the local activity and the number of transform coefficients.

27. Apparatus of embodiment 25 or 26, configured to decode the significance flag, the parity flag and the one or more greatness flags in one first pass so that the set of flags comprises the significance flag, the parity flag and the one or more greatness flags decoded for the set of neighboring transform coefficients, and to compute the activity based on a sum over an addend for each of the neighboring transform coefficients, the addends indicating a minimally assumed index or a minimally assumed reconstruction level for the neighboring transform coefficients determined based on the significance flag, the parity flag and the one or more greatness flags decoded for the neighboring transform coefficients.

28. Apparatus of any of embodiments 1 to 27, configured to decode, using context-adaptive binary arithmetic decoding, a first of the one or more greatness flags for a predetermined transform coefficient by selecting a context depending on a coefficient position of the predetermined transform coefficient inside the transform block.

29. Apparatus of any of embodiments 1 to 28, configured to decode, using context-adaptive binary arithmetic decoding, the first greatness flag for a predetermined transform coefficient by determining a local activity based on a set of flags decoded prior to the first greatness flag of the predetermined transform coefficient for a set of neighboring transform coefficients within a local template around the predetermined transform coefficient, and/or a number of transform coefficients within the local template around the predetermined transform coefficient, the reconstruction level of which is not zero, and selecting a context depending on the local activity and/or the number of transform coefficients.

30. Apparatus of embodiment 29, configured to select the context depending on a difference between the local activity and the number of transform coefficients inside the transform block.

31. Apparatus of embodiment 29 or 30, configured to decode the significance flag, the parity flag and the one or more greatness flags in one first pass so that the set of flags comprises the significance flag, the parity flag and the one or more greatness flags decoded for the set of neighboring transform coefficients, and to compute the activity based on a sum over an addend for each of the neighboring transform coefficients, the addends indicating a minimally assumed index or a minimally assumed reconstruction level for the neighboring transform coefficients determined based on the significance flag, the parity flag and the one or more greatness flags decoded for the neighboring transform coefficients.

32. Apparatus of any of embodiments 1 to 31, configured to decode the remainder for a predetermined transform coefficient using a Golomb-Rice code and using a Rice parameter which depends on a sum over an addend for each of out of a set of neighboring transform coefficients within a local template around the predetermined transform coefficient, the addend depending on a quantization index or a reconstruction level for the respective neighboring transform coefficient.

33. Apparatus for encoding a block of transform coefficients, configured to a) in one or more first passes of scanning the transform coefficients, encode, using context-adaptive binary arithmetic encoding, a significance flag (e.g. sig_flag[k]) for the current transform coefficients which indicates whether a quantization index (e.g. level[k]) of the current transform coefficients is zero, a parity flag (e.g. par_flag[k]) for the transform coefficients which indicates a parity of the transform coefficients, and one or more greatness flags (e.g. gt#_flag[k]) for transform coefficients the quantization index of which is not zero, and b) in one or more third passes, encode, using equiprobability binary arithmetic encoding, a remainder (e.g. remainder[k]) of the quantization index of the transform coefficients the one or more greatness flags of which are positive and a sign (e.g. sign[k]) of the quantization index of the transform coefficients the quantization index of which is not zero.

34. Apparatus of embodiment 33, configured to, in one first pass, for a currently scanned transform coefficient, a) decode, using context-adaptive binary arithmetic encoding, the significance flag for the currently scanned transform coefficient and b) if the significance flag indicates that the quantization index of the currently scanned transform coefficient is not zero, encode, for the currently scanned transform coefficient, using context-adaptive binary arithmetic encoding, the parity flag for the currently scanned transform coefficient.

35. Apparatus of embodiment 33 or 34, configured to, in the one or more second passes, for a currently scanned transform coefficient, if the quantization index of the currently scanned transform coefficient is not zero, encode, using context-adaptive binary arithmetic encoding, a first greatness flag for the currently scanned transform coefficient.

36. Apparatus of embodiment 35, configured so that, for a predetermined transform coefficient, the quantization index is obtainable according to a sum, addends of which are formed by the significance flag of the predetermined transform coefficient, the parity flag of the predetermined transform coefficient, and two times a sum of the remainder of the predetermined transform coefficient and the first greatness flag.

37. Apparatus of embodiment 36, configured to, in the one or more second passes, for a currently scanned transform coefficient, if the first greatness flag of the currently scanned transform coefficient is positive, encode, using context-adaptive binary arithmetic encoding, a second greatness flag for the currently scanned transform coefficient.

38. Apparatus of embodiment 37, configured to, for a predetermined transform coefficient, the quantization index is obtainable according to a sum, addends of which are formed by the significance flag of the predetermined transform coefficient, the parity flag of the predetermined transform coefficient, the first greatness flag of the predetermined transform coefficient, and two times a sum of the remainder of the predetermined transform coefficient and the second greatness flag.

39. Apparatus of any of embodiments 33 to 38, configured to perform each of the one or more second passes after each of the one or more first passes.

40. Apparatus of any of the preceding embodiments, wherein the transform coefficients of a transform block are partitioned into subblocks, and the transform coefficients are decoded subblock by subblock, where all passes over the scanning positions of a subblock are decoded before the first pass of the next subblock is decoded.

41. Apparatus of any of embodiments 33 to 40, configured to, quantize the quantization index of each transform coefficient the quantization index of which is not zero by selecting, for the respective transform coefficient, a set of reconstruction levels out of a plurality of reconstruction level sets depending on parities of quantization indices of transform coefficients preceding, along a scanning order, the respective transform coefficient, and quantizing the respective transform coefficient onto one level of the set of reconstruction levels which is indexed by the quantization index of the respective transform coefficient.

42. Apparatus of embodiment 47, configured to perform the selecting, for the respective transform coefficient, the set of reconstruction levels out of a plurality of reconstruction level sets using a state transitioning by selecting the set of reconstruction levels out of the plurality of reconstruction level sets uniquely based on a state which the state transitioning assumes for the respective transform coefficient, updating the state of the state transitioning a transform coefficient succeeding in the scanning order depending on the parity of the quantization index of the respective transform coefficient.

43. Apparatus of embodiment 42, configured to perform the one or more first passes, and the one or more second passes along the scanning order.

44. Apparatus of embodiment 42 or 43, configured to perform the state transitioning transitions between four distinct states.

45. Apparatus of any of embodiments 40 to 43, configured to parametrize the plurality of reconstruction level sets by way of a predetermined quantization step size and derive information on the predetermined quantization step size from the data stream.

46. Apparatus of any of embodiments 40 to 45 wherein each of the plurality of reconstruction level sets consists of multiples of a predetermined quantization step size which is constant for the plurality of reconstruction level sets.

47. Apparatus of any of embodiments 40 to 46, wherein the number of reconstruction level sets of the plurality of reconstruction level sets is two and the plurality of reconstruction level sets comprises a first reconstruction level set comprising zero and even multiples of a predetermined quantization step size, and a second reconstruction level set comprising zero and odd multiples of the predetermined quantization step size.

48. Apparatus of embodiment 47, configured to select the first reconstruction level set for the state values 0 and 1, and select the second reconstruction level set for the state values 2 and 3.

49. Apparatus of any of embodiments 33 to 48, configured to encode, using context-adaptive binary arithmetic encoding, the significance flag for a predetermined transform coefficient by selecting a context depending on a coefficient position of the predetermined transform coefficient inside the transform block.

50. Apparatus of any of embodiments 33 to 49, configured to encode, using context-adaptive binary arithmetic encoding, the significance flag for a predetermined transform coefficient by determining a local activity based on a set of flags decoded prior to the significance flag of the predetermined transform coefficient for a set of neighboring transform coefficients within a local template around the predetermined transform coefficient, and selecting a context depending on the local activity.

51. Apparatus of embodiment 50, configured to encode the significance flag, the parity flag and the one or more greatness flags in one first pass so that the set of flags comprises the significance flag, the parity flag and the one or more greatness flags decoded for the set of neighboring transform coefficients, and to compute the local activity based on a sum over an addend for each of the neighboring transform coefficients, the addends indicating a minimally assumed index or a minimally assumed reconstruction level for the neighboring transform coefficients determined based on the significance flag, the parity flag and the one or more greatness flags decoded for the neighboring transform coefficients.

52. Apparatus of any of embodiments 33 to 51, configured to a) perform the selecting, for the respective transform coefficient, the set of reconstruction levels out of a plurality of reconstruction level sets using a state transitioning by selecting the set of reconstruction levels out of the plurality of reconstruction level sets uniquely based on a state which the state transitioning assumes for the respective transform coefficient, updating the state of the state transitioning a transform coefficient succeeding in the scanning order depending on the parity of the quantization index of the respective transform coefficient, b) perform the one or more first passes along the scanning order, and c) encode, using context-adaptive binary arithmetic encoding, the significance flag for a predetermined transform coefficient by selecting a context depending on the state which the state transitioning assumes for the predetermined transform coefficient (13').

53. Apparatus of embodiment 52, configured to encode, using context-adaptive entropy encoding, the significance flag for a predetermined transform coefficient by selecting a context set comprising the context depending on the state and select the context out of the context set depending on a local activity around, or a coefficient position of the predetermined transform coefficient.

54. Apparatus of embodiment 53, wherein select a first context set for states 0 and 1, a second context set for state 2, and a third context set for state 3.

55. Apparatus of any of embodiments 33 to 54, configured to a) quantize the quantization index of each transform coefficient the quantization index of which is not zero by selecting, for the respective transform coefficient, a set of reconstruction levels out of a plurality of reconstruction level sets depending on parities of quantization indices of transform coefficients preceding, along a scanning order, the respective transform coefficient, and dequantizing the respective transform coefficient onto one level of the set of reconstruction levels which is indexed by the quantization index of the respective transform coefficient, b) perform the one or more first passes along the scanning order, and c) encode, using context-adaptive binary arithmetic encoding, the significance flag for a predetermined transform coefficient by selecting a context depending on the set (48) of reconstruction levels selected for the predetermined transform coefficient (13').

56. Apparatus of any of embodiments 33 to 55, configured to encode, using context-adaptive binary arithmetic encoding, the parity flag for a predetermined transform coefficient by selecting a context depending on a coefficient position of the predetermined transform coefficient inside the transform block.

57. Apparatus of any of embodiments 33 to 56, configured to encode, using context-adaptive binary arithmetic encoding, the parity flag for a predetermined transform coefficient by determining a local activity based on a set of flags decoded prior to the parity flag of the predetermined transform coefficient for a set of neighboring transform coefficients within a local template around the predetermined transform coefficient, and/or a number of transform coefficients within the local template around the predetermined transform coefficient, the reconstruction level of which is not zero, and selecting a context depending on the local activity and/or the number of transform coefficients.

58. Apparatus of embodiment 57, configured to select the context depending on a difference between the local activity and the number of transform coefficients.

59. Apparatus of embodiment 57 or 58, configured to encode the significance flag, the parity flag and the one or more greatness flags in one first pass so that the set of flags comprises the significance flag, the parity flag and the one or more greatness flags decoded for the set of neighboring transform coefficients, and to compute the activity based on a sum over an addend for each of the neighboring transform coefficients, the addends indicating a minimally assumed index or a minimally assumed reconstruction level for the neighboring transform coefficients determined based on the significance flag, the parity flag and the one or more greatness flags decoded for the neighboring transform coefficients.

60. Apparatus of any of embodiments 33 to 59, configured to encode, using context-adaptive binary arithmetic encoding, a first of the one or more greatness flags for a predetermined transform coefficient by selecting a context depending on a coefficient position of the predetermined transform coefficient inside the transform block.

61. Apparatus of any of embodiments 33 to 60, configured to encode, using context-adaptive binary arithmetic encoding, the first greatness flag for a predetermined transform coefficient by determining a local activity based on a set of flags decoded prior to the first greatness flag of the predetermined transform coefficient for a set of neighboring transform coefficients within a local template around the predetermined transform coefficient, and/or a number of transform coefficients within the local template around the predetermined transform coefficient, the reconstruction level of which is not zero, and selecting a context depending on the local activity and/or the number of transform coefficients.

62. Apparatus of embodiment 61, configured to select the context depending on a difference between the local activity and the number of transform coefficients.

63. Apparatus of embodiment 61 or 62, configured to encode, sequentially, the significance flag, the parity flag and the one or more greatness flags in one first pass so that the set of flags comprises the significance flag, the parity flag and the one or more greatness flags decoded for the set of neighboring transform coefficients, and to compute the activity based on a sum over an addend for each of the neighboring transform coefficients, the addends indicating a minimally assumed index or a minimally assumed reconstruction level for the neighboring transform coefficients determined based on the significance flag, the parity flag and the one or more greatness flags decoded for the neighboring transform coefficients.

64. Apparatus of any of embodiments 33 to 63, configured to encode the remainder for a predetermined transform coefficient using a Golomb-Rice code and using a Rice parameter which depends on a sum over an addend for each of out of a set of neighboring transform coefficients within a local template around the predetermined transform coefficient, the addend depending on a quantization index or a reconstruction level for the respective neighboring transform coefficient.

65. Method performed by an apparatus according to any of the above embodiments.

66. Computer program for instructing a computer executing same to perform a method according to embodiment 65.

67. Data stream generated by an apparatus according to any of embodiments 33 to 64.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded data stream can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] ITU-T and ISOIIEC, "Advanced video coding for audio-visual services," ITU-T Rec. H.264 and ISOIIEC 14406-10 (AVC), 2003.
[2] ITU-T and ISOIIEC, "High efficiency video coding," ITU-T Rec. H.265 and ISOIIEC 23008-10 (HEVC), 2013.
[3] Abrecht, et. al., "Description of SDR, HDR, and 360° video coding technology proposal by Fraunhofer HHI," Joint Video Experts Team (JVET), doc. JVET-J0014, April 2018.

The invention claimed is:

1. A video decoder for decoding pictures from a data stream, the video decoder configured to:
   determine a first transform coefficient level of a first transform coefficient based on a first significant coefficient flag indicating whether the first transform coefficient level is non-zero;
   decode a sign coefficient of 1 or −1 when the first transform coefficient level is non-zero;
   determine a reconstruction level set for the first transform coefficient level out of a plurality of reconstruction level sets based on a state variable, wherein the state variable can be any of 0, 1, 2, or 3, and wherein the plurality of reconstruction level sets comprises two reconstruction level sets;
   select a first reconstruction level set if the state variable is 0 or 1 and select a second reconstruction level set if the state variable is 3 or 4;
   assign a reconstruction level of the reconstruction level set for the first transform coefficient based on the first transform coefficient level, wherein the reconstruction level is assigned based on twice the first transform coefficient level if the first reconstruction level set is selected and is assigned based on twice the first transform coefficient level minus the sign coefficient if the second reconstruction level set is selected;

update the state variable based on a parity of the first transform coefficient level;

select a context based on the updated state variable for decoding a second significant coefficient flag from the data stream using context adaptive entropy decoding, the second significant coefficient flag indicating whether a second transform coefficient level of a second transform coefficient which follows the first transform coefficient in a scan order is nonzero; and decode the second significant coefficient flag using the selected context.

2. The video decoder of claim 1, configured to determine the parity of the first transform coefficient level by decoding a parity flag from the data stream.

3. The video decoder of claim 2, configured to decode the parity flag using context adaptive entropy decoding.

4. The video decoder of claim 1, wherein the context is selected based on a position of the second transform coefficient.

5. The video decoder of claim 1, wherein the context is selected based on a local activity around the second transform coefficient.

6. The video decoder of claim 1 configured to select a first context if the state variable is 0 or 1, a second context if the state variable is 2 and a third context if the state variable is 3.

7. The video decoder of claim 1, configured to update the state variable by:
if the state variable is 0:
updating the state variable to 0 if the parity is 0 and 2 if the parity is 1;
if the state variable is 1:
updating the state variable to 2 if the parity is 0 and 0 if the parity is 1;
if the state variable is 2:
updating the state variable to 1 if the parity is 0 and 3 if the parity is 1;
and if the state variable is 3:
updating the state variable to 3 if the parity is 0 and 1 if the parity is 1.

8. A video decoding method for decoding pictures from a data stream, the method comprising:
determining a first transform coefficient level of a first transform coefficient based on a first significant coefficient flag indicating whether the first transform coefficient level is non-zero;
decoding a sign coefficient of 1 or −1 when the first transform coefficient level is non-zero;
determining a reconstruction level set for the first transform coefficient level out of a plurality of reconstruction level sets based on a state variable, wherein the state variable can be any of 0, 1, 2, or 3, and wherein the plurality of reconstruction level sets comprises two reconstruction level sets;

selecting a first reconstruction level set if the state variable is 0 or 1 and selecting a second reconstruction level set if the state variable is 3 or 4;

assigning a reconstruction level of the reconstruction level set for the first transform coefficient based on the first transform coefficient level;

assigning the reconstruction level based on twice the first transform coefficient level if the first reconstruction level set is selected and twice the first transform coefficient level minus the sign coefficient if the second reconstruction level set is selected;

updating the state variable based on a parity of the first transform coefficient level;

selecting a context based on the updated state variable for decoding a second significant coefficient flag from the data stream using context adaptive entropy decoding, the second significant coefficient flag indicating whether a second transform coefficient level of a second transform coefficient which follows the first transform coefficient in a scan order is nonzero; and decoding the second significant coefficient flag using the selected context.

9. The video decoding method of claim 8, comprising determining the parity of the first transform coefficient level by decoding a parity flag from the data stream.

10. The video decoding method of claim 9, comprising decoding the parity flag using context adaptive entropy decoding.

11. The video decoding method of claim 8, wherein the context is selected based on a position of the second transform coefficient.

12. The video decoding method of claim 8, wherein the context is selected based on a local activity around the second transform coefficient.

13. The video decoding method of claim 8 comprising selecting a first context if the state variable is 0 or 1, a second context if the state variable is 2 and a third context if the state variable is 3.

14. The video decoding method of claim 8, comprising updating the state variable by:
if the state variable is 0:
updating the state variable to 0 if the parity is 0 and 2 if the parity is 1;
if the state variable is 1:
updating the state variable to 2 if the parity is 0 and 0 if the parity is 1;
if the state variable is 2:
updating the state variable to 1 if the parity is 0 and 3 if the parity is 1;
and if the state variable is 3:
updating the state variable to 3 if the parity is 0 and 1 if the parity is 1.

* * * * *